(12) United States Patent
Hsieh et al.

(10) Patent No.: US 8,804,252 B2
(45) Date of Patent: Aug. 12, 2014

(54) OPTICAL IMAGE CAPTURING LENS SYSTEM

(75) Inventors: Dung-Yi Hsieh, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 84 days.

(21) Appl. No.: 13/598,595

(22) Filed: Aug. 29, 2012

(65) Prior Publication Data
US 2013/0155526 A1 Jun. 20, 2013

(30) Foreign Application Priority Data
Dec. 14, 2011 (TW) .............................. 100146285 A

(51) Int. Cl.
*G02B 13/18* (2006.01)
*G02B 9/34* (2006.01)

(52) U.S. Cl.
USPC ........... 359/715; 359/708; 359/771; 359/772; 359/773; 359/774

(58) Field of Classification Search
CPC .............. G02B 9/34; G02B 9/36; G02B 9/56; G02B 13/004
USPC ................. 359/676, 677, 680–682, 686, 687, 359/708–715, 745–747, 749–759, 761, 762, 359/767, 769, 770–774
See application file for complete search history.

(56) References Cited

U.S. PATENT DOCUMENTS

| | | | |
|---|---|---|---|
| 7,206,143 B2* | 4/2007 | Kamo et al. | 359/771 |
| 7,755,854 B2* | 7/2010 | Sano | 359/773 |
| 7,760,444 B2* | 7/2010 | Iyama | 359/749 |
| 7,920,340 B2* | 4/2011 | Tang | 359/773 |
| 7,957,075 B2 | 6/2011 | Tang | |
| 8,149,523 B2* | 4/2012 | Ozaki | 359/773 |
| 8,559,118 B2* | 10/2013 | Engelhardt et al. | 359/715 |
| 2011/0134305 A1* | 6/2011 | Sano et al. | 348/340 |
| 2013/0208171 A1* | 8/2013 | Lai | 348/340 |

FOREIGN PATENT DOCUMENTS

| | | |
|---|---|---|
| TW | M347577 | 12/2008 |
| TW | 201111829 A1 | 4/2011 |
| TW | 201122540 A1 | 7/2011 |

OTHER PUBLICATIONS

Wang et al., Comparison of resolution characteristics between exponential-doping and uniform-doping GaN photocathodes, 2013, Proc. of SPIE, vol. 8912.*

* cited by examiner

*Primary Examiner* — Thomas K Pham
*Assistant Examiner* — Nicholas Pasko
(74) *Attorney, Agent, or Firm* — CKC & Partners Co., Ltd.

(57) ABSTRACT

An optical image capturing lens system includes, in order from an object side to an image side, a first lens element, a second lens element, a third lens element and a fourth lens element. The first lens element with positive refractive power has a convex object-side surface. The second lens element has negative refractive power. The third lens element has positive refractive power, wherein an object-side surface and an image-side surface of the third lens element are aspheric. The fourth lens element with refractive power is made of plastic material and has a concave image-side surface, wherein an object-side surface and the image-side surface of the fourth lens element are aspheric, and the fourth lens element has at least one inflection point formed on at least one of the object-side surface and the image-side surface thereof.

24 Claims, 26 Drawing Sheets

OPTICAL IMAGE CAPTURING LENS SYSTEM

RELATED APPLICATIONS

The application claims priority to Taiwan Application Serial Number 100146285, filed Dec. 14, 2011, which is herein incorporated by reference.

BACKGROUND

1. Technical Field

The present invention relates to an optical image capturing lens system. More particularly, the present invention relates to a compact optical image capturing lens system applicable to electronic products.

2. Description of Related Art

In recent years, with the popularity of mobile products with camera functionalities, the demand for miniaturizing an image lens system is increasing. The sensor of a conventional photographing camera is typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact image lens system has gradually evolved toward the field of higher megapixels, there is an increasing demand for compact image lens system featuring better image quality.

A conventional compact image lens system in a portable electronic product typically utilizes a three-element lens structure. Such a conventional image lens system has a first lens element with positive refractive power, a second lens element with negative refractive power and a third lens element with positive refractive power. The first, second and third lens elements are arranged in this order from an object-side to an image-side. While the three-element lens structure is compact, it is not able to produce high quality images.

Another conventional compact image lens system provides a four-element lens structure. In the said image lens system, the difference between the minimum effective radius and the maximum effective radius is large, so that the angle of incident light on the image sensor is too large and the sensitivity of the image sensor would be worse. The angles of the incident light on the surfaces of the lens elements are too large which would generate the stray light by the reflection. Moreover, said image lens system includes a small stop which cannot reduce the interference of diffraction and lead to worse image quality. The small stop also cannot raise the incident light, so that the small stop cannot increase the image quality under insufficient lighting condition.

Therefore, a need exists in the art for providing an image lens system for use in a mobile electronic product that has excellent imaging quality without too long total track length, and with small difference between the minimum effective radius and the maximum effective radius and large stop.

SUMMARY

According to one aspect of the present disclosure, an optical image capturing lens system includes, in order from an object side to an image side, a first lens element, a second lens element, a third lens element and a fourth lens element. The first lens element with positive refractive power has a convex object-side surface. The second lens element has negative refractive power. The third lens element has positive refractive power, wherein an object-side surface and an image-side surface of the third lens element are aspheric. The fourth lens element with refractive power is made of plastic material and has a concave image-side surface, wherein an object-side surface and the image-side surface of the fourth lens element are aspheric, and the fourth lens element has at least one inflection point formed on at least one of the object-side surface and the image-side surface thereof. When a distance perpendicular to an optical axis between the inflection point on the image-side surface of the fourth lens element and the optical axis is Yc42, an effective radius of the image-side surface of the fourth lens element is SD42, a maximum effective radius of the surfaces of the first through fourth lens elements is SDmax, and a minimum effective radius of the surfaces of the first through fourth lens elements is SDmin, the following relationships are satisfied:

$$0.2 < Yc42/SD42 < 0.95; \text{ and}$$

$$1.0 \leq SDmax/SDmin \leq 2.0.$$

According to another aspect of the present disclosure, an optical image capturing lens system includes, in order from an object side to an image side, a first lens element, a second lens element, a third lens element and a fourth lens element. The first lens element with positive refractive power has a convex object-side surface. The second lens element has negative refractive power. The third lens element with positive refractive power has a convex image-side surface, wherein an object-side surface and the image-side surface of the third lens element are aspheric. The fourth lens element with refractive power is made of plastic material and has a concave image-side surface, wherein an object-side surface and the image-side surface of the fourth lens element are aspheric, and the fourth lens element has at least one inflection point formed on at least one of the object-side surface and the image-side surface thereof. When a distance perpendicular to an optical axis between the inflection point on the image-side surface of the fourth lens element and the optical axis is Yc42, an effective radius of the image-side surface of the fourth lens element is SD42, a focal length of the optical image capturing lens system is f, and an entrance pupil diameter of the optical image capturing lens system is EPD, the following relationships are satisfied:

$$0.2 < Yc42/SD42 < 0.95; \text{ and}$$

$$f/EPD < 1.9.$$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
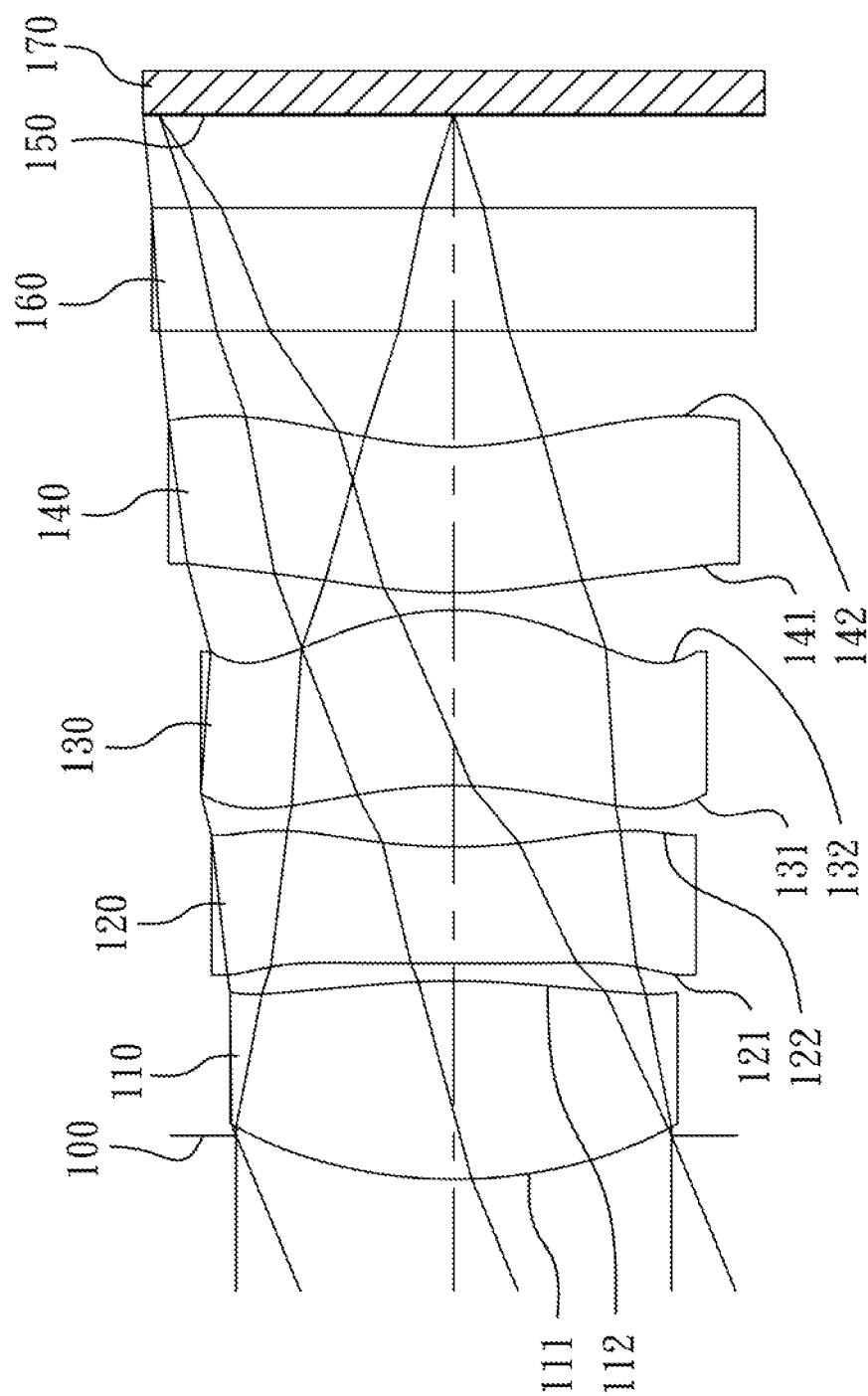
FIG. 1 is a schematic view of an optical image capturing lens system according to the 1st embodiment of the present disclosure.

An optical image capturing lens system includes, in order from an object side to an image side, a first lens element, a second lens element, a third lens element and a fourth lens element. The optical image capturing lens system further includes an image sensor located on an image plane.

The first through fourth lens elements can be four independent and non-cemented lens elements. That is, any two lens elements adjacent to each other are not cemented, and there is an air space between the two lens elements. The manufacture of the cemented lenses is more complex than the manufacture of the non-cemented lenses. Especially, the cemented surfaces of the two lens elements should have accurate curvatures for ensuring the connection between the two lens elements, and the displacement between the cemented surfaces of the two lens elements during cementing the lens elements may affect the optical quality of the optical image capturing lens system. Therefore, the optical image capturing lens system of the present disclosure provides six independent and non-cemented lens elements for improving the problem generated by the cemented lens elements.

The first lens element with positive refractive power has a convex object-side surface, so that the total track length of the optical image capturing lens system can be reduced by adjusting the positive refractive power of the first lens element.

The second lens element with negative refractive power can correct the aberration generated from the first lens element with positive refractive power. The second lens element has a concave image-side surface, so that the refractive power of the second lens element is proper by adjusting the shape of the image-side surface of the second lens element, and the aberration of the optical image capturing lens system can further be reduced.

The third lens element with positive refractive power distributes the positive refractive power of the first lens element, so that the sensitivity of the optical image capturing lens system can be reduced. The third lens element has a concave object-side surface and a convex image-side surface. Therefore, the astigmatism of the optical image capturing lens system can be reduced.

The fourth lens element can have positive refractive power or negative refractive power, and has a convex object-side surface and a concave image-side surface. Therefore, the principal point of the optical image capturing lens system can be positioned away from the image plane, and the total track length of the optical image capturing lens system can be reduced so as to maintain the compact size thereof. Furthermore, the fourth lens element has inflection point formed on at least one of the object-side surface and the image-side surface thereof, so that the incident angle of the off-axis field on the image sensor can be effectively minimized and the aberration can be corrected as well.

When a distance perpendicular to the optical axis between the inflection point on the image-side surface of the fourth lens element and the optical axis is Yc42, and an effective radius of the image-side surface of the fourth lens element is SD42, the following relationship is satisfied:

$$0.2 < Yc42/SD42 < 0.95.$$

Therefore, the incident angle of the off-axis field on the image sensor can be further minimized and the aberration can be corrected as well, and the image quality can be increased.

When a maximum effective radius of the surfaces of the first through fourth lens elements is SDmax, and a minimum effective radius of the surfaces of the first through fourth lens elements is SDmin, the following relationship is satisfied:

$$1.0 \le SDmax/SDmin \le 2.0.$$

By such arrangement, the angles of incident light on the surfaces of the lens elements can be minimized, so that the stray light of the optical image capturing lens system can be avoided for increasing the image quality. Furthermore, the external diameters of the lens elements are similar, so that the fabrication of the optical image capturing lens system would be easier.

SDmax and SDmin can further satisfy the following relationship:

$1.0 \leq SDmax/SDmin \leq 1.75.$

Moreover, SDmax and SDmin can satisfy the following relationship:

$1.0 \leq SDmax/SDmin \leq 1.5.$

When a focal length of the optical image capturing lens system is f, and an entrance pupil diameter of the optical image capturing lens system is EPD, to the following relationship is satisfied:

$f/EPD<1.9.$

Therefore, the optical image capturing lens system can obtain the characteristic of large stop for retaining high image quality under insufficient lighting condition, and can also increase the diffraction limit of the modulation transfer function (MTF) for retaining high resolution.

f and EPD can further satisfy the following relationship:

$f/EPD<1.7,$

When an axial distance between the object-side surface of the first lens element and an image plane is TTL, the following relationship is satisfied:

$TTL<2.1$ mm.

Therefore, the total track length of the optical image capturing lens system can be reduced so as to maintain the compact size of the optical image capturing lens system for portable electronic products.

When the axial distance between the object-side surface of the first lens element and an image plane is TTL, and the entrance pupil diameter of the optical image capturing lens system is EPD, the following relationship is satisfied:

$1.5<TTL/EPD<3.0.$

Therefore, the optical image capturing lens system can obtain the characteristic of large stop for retaining high image quality under insufficient lighting condition, and can also increase the diffraction limit of the modulation transfer function (MTF) for retaining high resolution. Furthermore, the proper ratio of the total track length and the entrance pupil can apply to the compact size products.

When an Abbe number of the first lens element is V1, and an Abbe number of the second lens element is V2, the following relationship is satisfied:

$2.0<V1/V2<3.0.$

Therefore, the chromatic aberration of the optical image capturing lens system can be corrected.

When the focal length of the optical image capturing lens system is f, and a focal length of the fourth lens element is f4, the following relationship is satisfied:

$-0.6<f/f4<0.2.$

Therefore, the high order aberration of the optical image capturing lens system can be corrected by adjusting the refractive power of the fourth lens element.

When a maximal field of view of the optical age capturing lens system is FOV, the following relationship is satisfied:

$FOV<50$ degrees.

Therefore, the angle of the incident light on the image sensor is proper for increasing the sensitivity of the image sensor.

When a maximum of a chief ray angle of the optical image capturing lens system is CRAmax, the following relationship is satisfied:

$CRAmax<25.0$ degrees.

Therefore, the angle of the incident light on the image sensor can be controlled for increasing the sensitivity of the image sensor.

When a modulation transfer function value at the central field with the spatial frequency of 400 lp/mm is MTF400, the following relationship is satisfied:

$0.4<MTF400.$

Therefore, the resolving power of the optical image capturing lens system can be enhanced.

When a sum of the central thickness from the first through fourth lens elements is ΣCT, and the axial distance between the object-side surface of the first lens element and an image plane is TTL, the following relationship is satisfied:

$0.58<\Sigma CT/TTL<0.80.$

Therefore, the thickness of the lens elements can reduce the total track length of the optical image capturing lens system so as to maintain the compact size of the optical image capturing lens system for portable electronic products.

According to the optical image capturing lens system of the present disclosure, the lens elements thereof can be made of glass or plastic material. When the lens elements are made of glass material, the distribution of the refractive power of the optical image capturing lens system may be more flexible for design. When the lens elements are made of plastic material, the cost of manufacture can be effectively reduced. Furthermore, the surface of each lens element can be aspheric, so that it is easier to make the surface into non-spherical shapes. As a result, more controllable variables are obtained, and the aberration is reduced, as well as the number of required lens elements can be reduced while constructing an optical system. Therefore, the total track length of the optical image capturing lens system can also be reduced.

According to the optical image capturing lens system of the present disclosure, when the lens element has a convex surface, it indicates that the paraxial region of the surface is convex; and when the lens element has a concave surface, it indicates that the paraxial region of the surface is concave.

According to the optical image capturing lens system of the present disclosure, the optical image capturing lens system can include at least one stop, such as an aperture stop, glare stop, field stop, etc. Said glare stop or said field stop is allocated for reducing stray light while retaining high image quality. Furthermore, when the stop is an aperture stop, the position of the aperture stop within an optical system can be arbitrarily placed in front of the entire optical system, within the optical system, or in front of the image plane in accordance with the preference of the optical designer, in order to achieve the desirable optical features or higher image quality produced from the optical system.

According to the above description of the present disclosure, the following 1st-8th specific embodiments are provided for further explanation.

1st Embodiment

Figure 2:
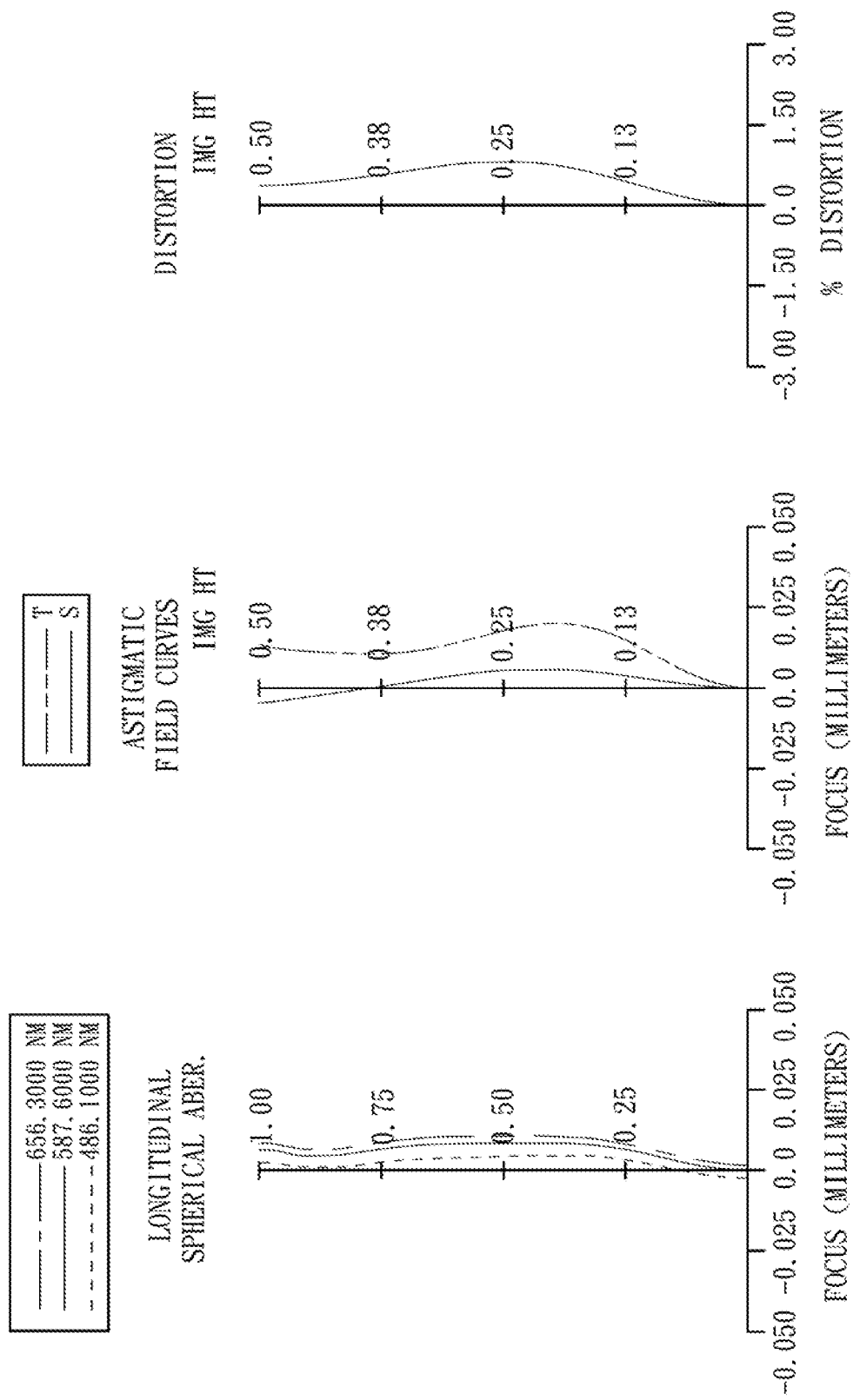
FIG. 2 shows spherical aberration curves, astigmatic field curves and a distortion curve of the optical image capturing lens system according to the 1st embodiment.
Figure 3:
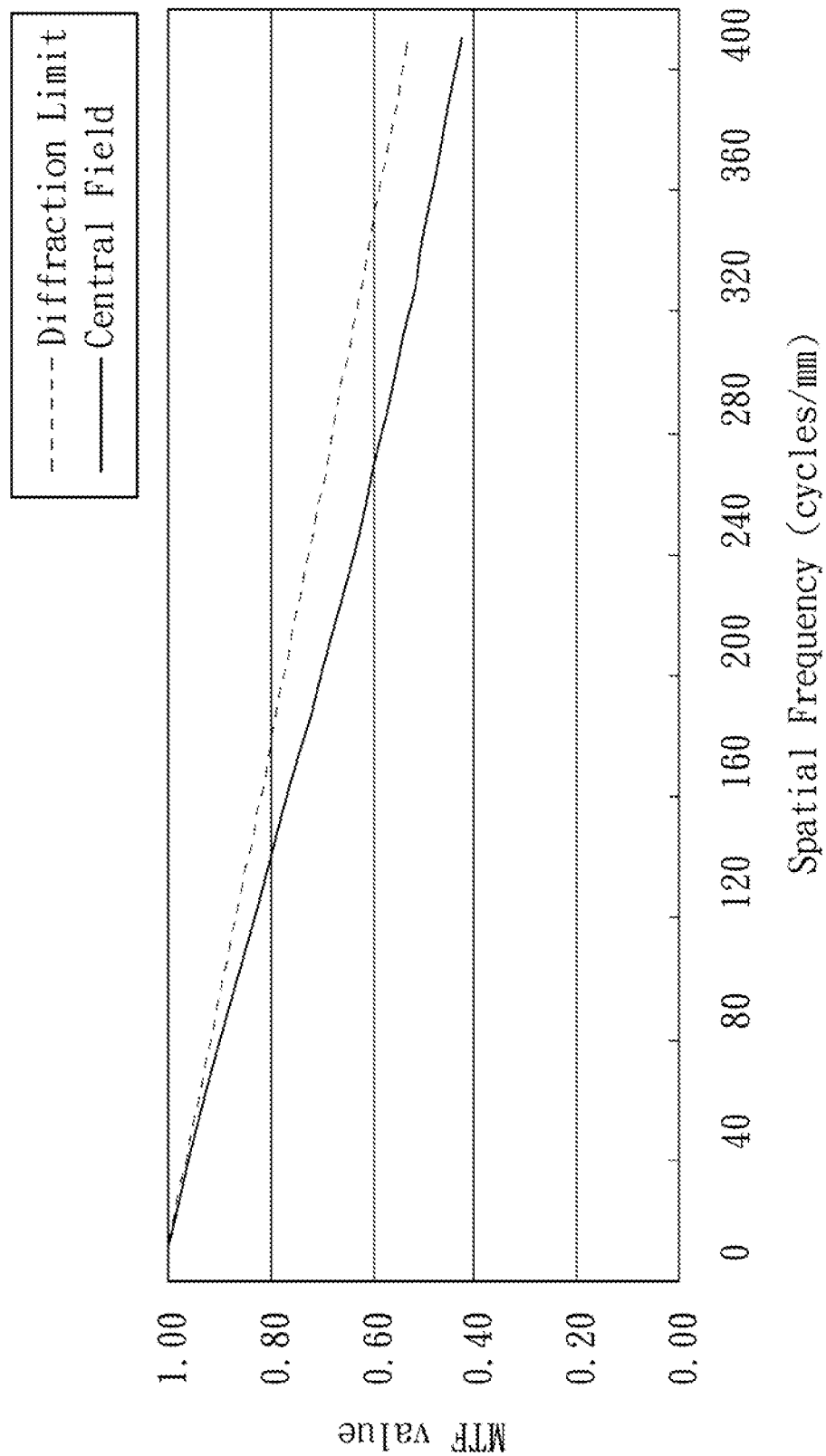
FIG. 3 shows relationship diagrams of spatial frequency-diffraction limit value and spatial frequency-field modulation transfer function value according to the 1st embodiment.

FIG. 1 is a schematic view of an optical image capturing lens system according to the 1st embodiment of the present disclosure. FIG. 2 shows spherical aberration curves, astigmatic field curves and a distortion curve of the optical image capturing lens system according to the 1st embodiment. FIG. 3 shows relationship diagrams of spatial frequency-diffraction limit value and spatial frequency-field modulation transfer function value according to the 1st embodiment. In FIG. 1, the optical image capturing lens system includes, in order from an object side to an image side, an aperture stop 100, a first lens element 110, a second lens element 120, a third lens element 130, a fourth lens element 140, an IR-filter 160, an image plane 150 and an image sensor 170.

The first lens element 110 with positive refractive power has a convex object-side surface 111 and a convex image-side surface 112, and is made of plastic material. The object-side surface 111 and the image-side surface 112 of the first lens element 110 are aspheric.

The second lens element 120 with negative refractive power has a concave object-side surface 121 and a concave image-side surface 122, and is made of plastic material. The object-side surface 121 and the image-side surface 122 of the second lens element 120 are aspheric.

The third lens element 130 with positive refractive power has a concave object-side surface 131 and a convex image-side surface 132, and is made of plastic material. The object-side surface 131 and the image-side surface 132 of the third lens element 130 are aspheric.

The fourth lens element 140 with negative refractive power has a convex object-side surface 141 and a concave image-side surface 142, and is made of plastic material. The object-side surface 141 and the image-side surface 142 of the fourth lens element 140 are aspheric. Furthermore, the fourth lens element 140 has inflection points formed on the object-side surface 141 and the image-side surface 142 thereof.

The IR-filter 160 is made of glass and located between the fourth lens element 140 and the image plane 150, and will not affect the focal length of the optical image capturing lens system.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i)$$

where:

X is the distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the optical image capturing lens system according to the 1st embodiment, when a focal length of the optical image capturing lens system is f, an f-number of the optical image capturing lens system is Fno, a half of the maximal field of view of the optical image capturing lens system is HFOV, and a maximal field of view of the optical image capturing lens system is FOV, these parameters have the following values:

f=1.21 mm;
Fno=1.62;
HFOV=22.5 degrees; and
FOV=45.0 degrees.

In the optical image capturing lens system according to the 1st embodiment, when an Abbe number of the first lens element 110 is V1, and an Abbe number of the second lens element 120 is V2, the following relationship is satisfied:

$V1/V2=2.40$.

In the optical image capturing lens system according to the 1st embodiment, when a sum of the central thickness from the first 110 through fourth lens elements 140 is ΣCT, and an axial distance between the object-side surface 111 of the first lens element 110 and an image plane 150 is TTL, the following relationship is satisfied:

$\Sigma CT/TTL=0.62$.

In the optical image capturing lens system according to the 1st embodiment, when the focal length of the optical image capturing lens system is f, and a focal length of the fourth lens element 140 is f4, the following relationship is satisfied:

$f/f4=-0.29$.

In the optical image capturing lens system according to the 1st embodiment, when the focal length of the optical image capturing lens system is f, and an entrance pupil diameter of the optical image capturing lens system is EPD, the following relationship is satisfied.

$f/EPD=1.62$.

Figure 25:
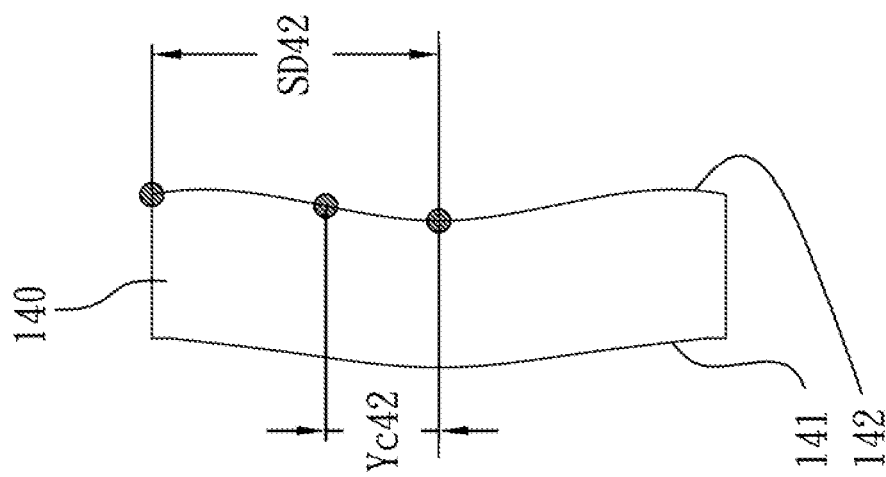
FIG. 25 shows the fourth lens element of the optical image capturing lens system according to the 1st embodiment of the present disclosure.

FIG. 25 shows the fourth lens element 140 of the optical image capturing lens system according to the 1st embodiment of the present disclosure. In FIG. 25, when a distance perpendicular to the optical axis between the inflection point on the image-side surface 142 of the fourth lens element 140 and the optical axis is Yc42, an effective radius of the image-side surface 142 of the fourth lens element 140 is SD42, the following relationship is satisfied:

$Yc42/SD42=0.39$.

Figure 26:
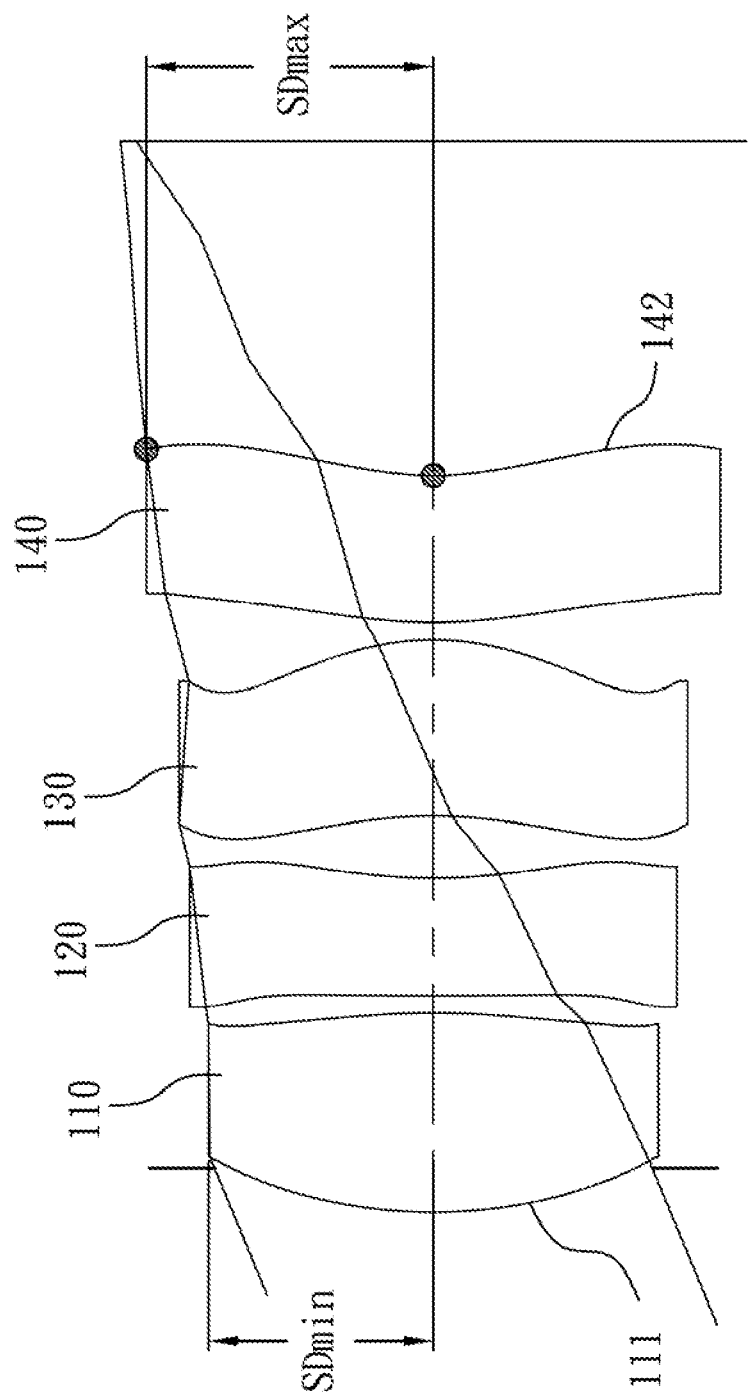
FIG. 26 shows the path of incident light of the optical image capturing lens system according to the 1st embodiment of the present disclosure.

FIG. 26 shows the path of incident light of the optical image capturing lens system according to the 1st embodiment of the present disclosure. In FIG. 26, when a maximum effective radius of the surfaces of the first 110 through fourth lens elements 140 is SDmax, and a minimum effective radius of the surfaces of the first 110 through fourth lens elements 140 is SDmin, the following relationship is satisfied:

$SDmax/SDmin=1.28$.

In the optical image capturing lens system according to the 1st embodiment, when the axial distance between the object-side surface 111 of the first lens element 110 and an image plane 150 is TTL, and the entrance pupil diameter of the optical image capturing lens system is EPD, the following relationships are satisfied:

$TTL=1.76$ mm; and $TTL/EPD=2.35$.

In the optical image capturing lens system according to the 1st embodiment, when a modulation transfer function value at the central field with the spatial frequency of 400 lp/mm is MTF400, the following relationship is satisfied:

$MTF400=0.43$.

In the optical image capturing lens system according to the 1st embodiment, when a maximum of a chief ray angle of the optical image capturing lens system is CRAmax, the following relationship is satisfied:

$CRAmax=18.54$ degrees.

The detailed optical data of the 1st embodiment are shown in Table 1, the aspheric surface data are shown in Table 2, and the modulation transfer function (MTF) values are shown in Table 3 below.

TABLE 1

1st Embodiment
f = 1.21 mm, Fno = 1.62, HFOV = 22.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.075 | | | | |
| 2 | Lens 1 | 0.869910 (ASP) | 0.340 | Plastic | 1.544 | 55.9 | 0.98 |
| 3 | | −1.183900 (ASP) | 0.030 | | | | |
| 4 | Lens 2 | −100.000000 (ASP) | 0.200 | Plastic | 1.640 | 23.3 | −1.52 |
| 5 | | 0.984890 (ASP) | 0.106 | | | | |
| 6 | Lens 3 | −0.762390 (ASP) | 0.300 | Plastic | 1.544 | 55.9 | 1.58 |
| 7 | | −0.459540 (ASP) | 0.030 | | | | |
| 8 | Lens 4 | 0.872380 (ASP) | 0.250 | Plastic | 1.544 | 55.9 | −4.24 |
| 9 | | 0.569010 (ASP) | 0.200 | | | | |
| 10 | IR-filter | Plano | 0.210 | Glass | 1.517 | 64.2 | — |
| 11 | | Plano | 0.160 | | | | |
| 12 | Image | Plano | — | | | | |

Note:
Reference wavelength (d-line) is 587.6 nm.

TABLE 2

Aspheric Coefficients

| Surface # | | | | |
|---|---|---|---|---|
| | 2 | 3 | 4 | 5 |
| k = | −2.82114E+00 | −5.59563E+01 | 1.00000E+00 | 3.34902E+00 |
| A4 = | 6.74537E−01 | 9.81525E−01 | 2.71228E+00 | −1.15328E+00 |
| A6 = | 3.65810E−01 | −5.73615E+00 | −5.17046E+01 | −1.85340E+01 |
| A8 = | 1.56708E+00 | −4.02782E+01 | 2.41815E+02 | −8.88664E+01 |
| A10 = | 1.96552E+01 | 4.58717E+02 | −9.08459E+02 | 1.00746E+03 |
| A12 = | | | 3.59382E+03 | −1.68617E+03 |

| Surface # | | | | |
|---|---|---|---|---|
| | 6 | 7 | 8 | 9 |
| k = | −8.29483E+00 | −4.65407E+00 | −3.33136E+00 | −4.42126E+00 |
| A4 = | 1.28317E+00 | −2.59145E+00 | −3.01225E+00 | −3.69380E+00 |
| A6 = | −2.69364E+00 | 2.52062E+01 | 1.25806E+01 | 1.70322E+01 |
| A8 = | 7.47724E+01 | −4.33401E+01 | −3.21488E+01 | −5.64936E+01 |
| A10 = | −6.28048E+02 | 2.27496E+02 | 2.19236E+02 | 6.13411E+01 |
| A12 = | 3.13139E+03 | 1.86913E+03 | −1.95122E+03 | 2.10344E+02 |
| A14 = | 6.39396E+02 | −4.70831E+03 | 8.78897E+03 | −6.53078E+02 |
| A16 = | −2.72698E+04 | −2.80831E+04 | −1.51140E+04 | 3.61874E+02 |

TABLE 3

| Spatial Frequency (Cycles/mm) | Diffraction Limit Value | Central Field Modulation Transfer Function (MTF) Value |
|---|---|---|
| 0 | 1.00 | 1.00 |
| 20 | 0.98 | 0.97 |
| 40 | 0.95 | 0.95 |
| 60 | 0.93 | 0.92 |
| 80 | 0.90 | 0.88 |
| 100 | 0.88 | 0.85 |
| 120 | 0.85 | 0.82 |
| 140 | 0.83 | 0.78 |
| 160 | 0.81 | 0.75 |
| 180 | 0.78 | 0.72 |
| 200 | 0.76 | 0.68 |
| 220 | 0.74 | 0.65 |
| 240 | 0.71 | 0.62 |
| 260 | 0.69 | 0.60 |
| 280 | 0.67 | 0.57 |
| 300 | 0.64 | 0.54 |
| 320 | 0.62 | 0.52 |
| 340 | 0.60 | 0.49 |
| 360 | 0.57 | 0.47 |
| 380 | 0.55 | 0.45 |
| 400 | 0.53 | 0.43 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. In Table 3, the spatial frequency and the corresponding diffraction limit values and central field modulation transfer function (MTF) values are represented. This information related to Table 1, Table 2 and Table 3 applies also to the Tables for the remaining embodiments, and so an explanation in this regard will not be provided again.

2nd Embodiment

Figure 4:
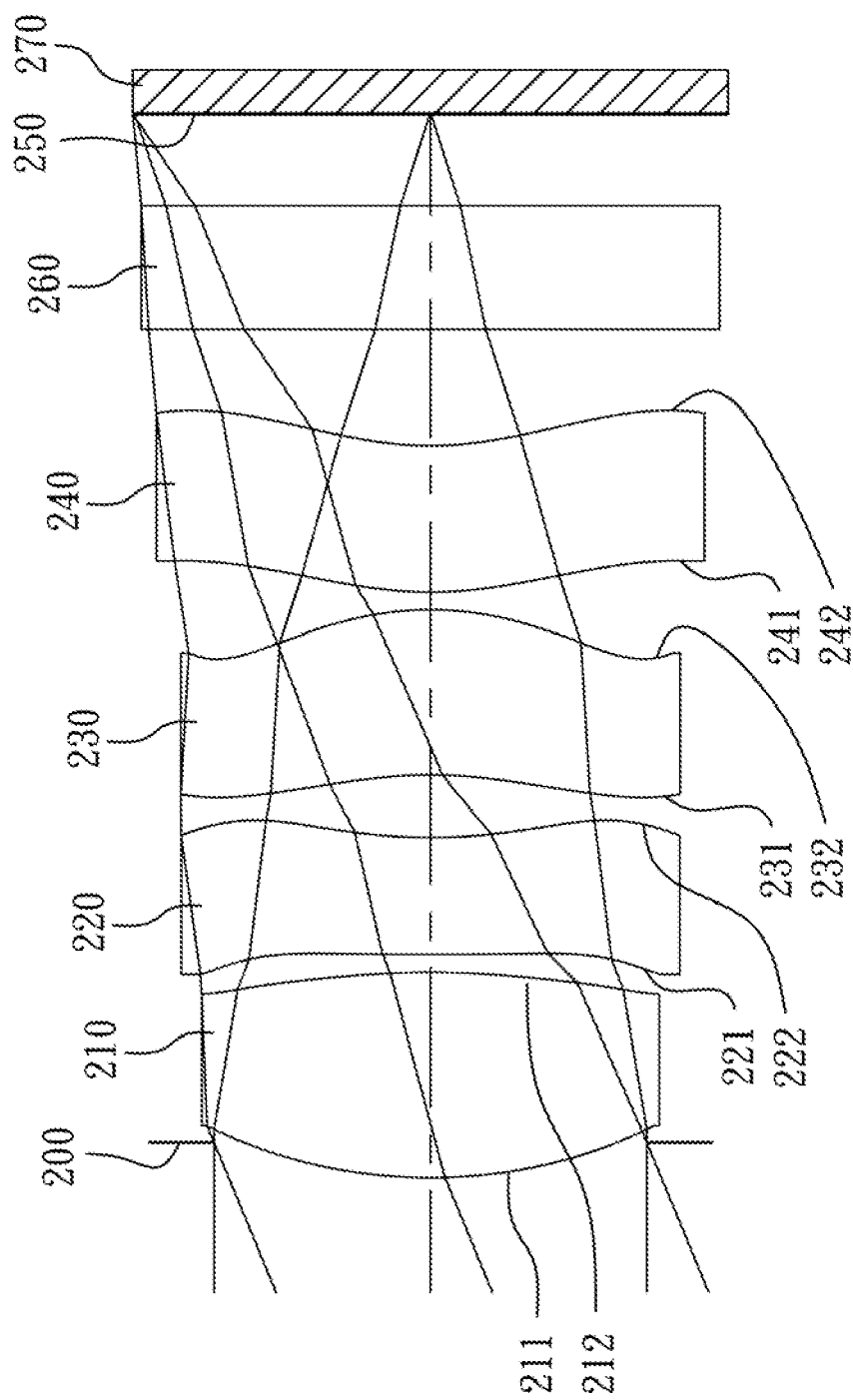
FIG. 4 is a schematic view of an optical image capturing lens system according to the 2nd embodiment of the present disclosure.
Figure 5:
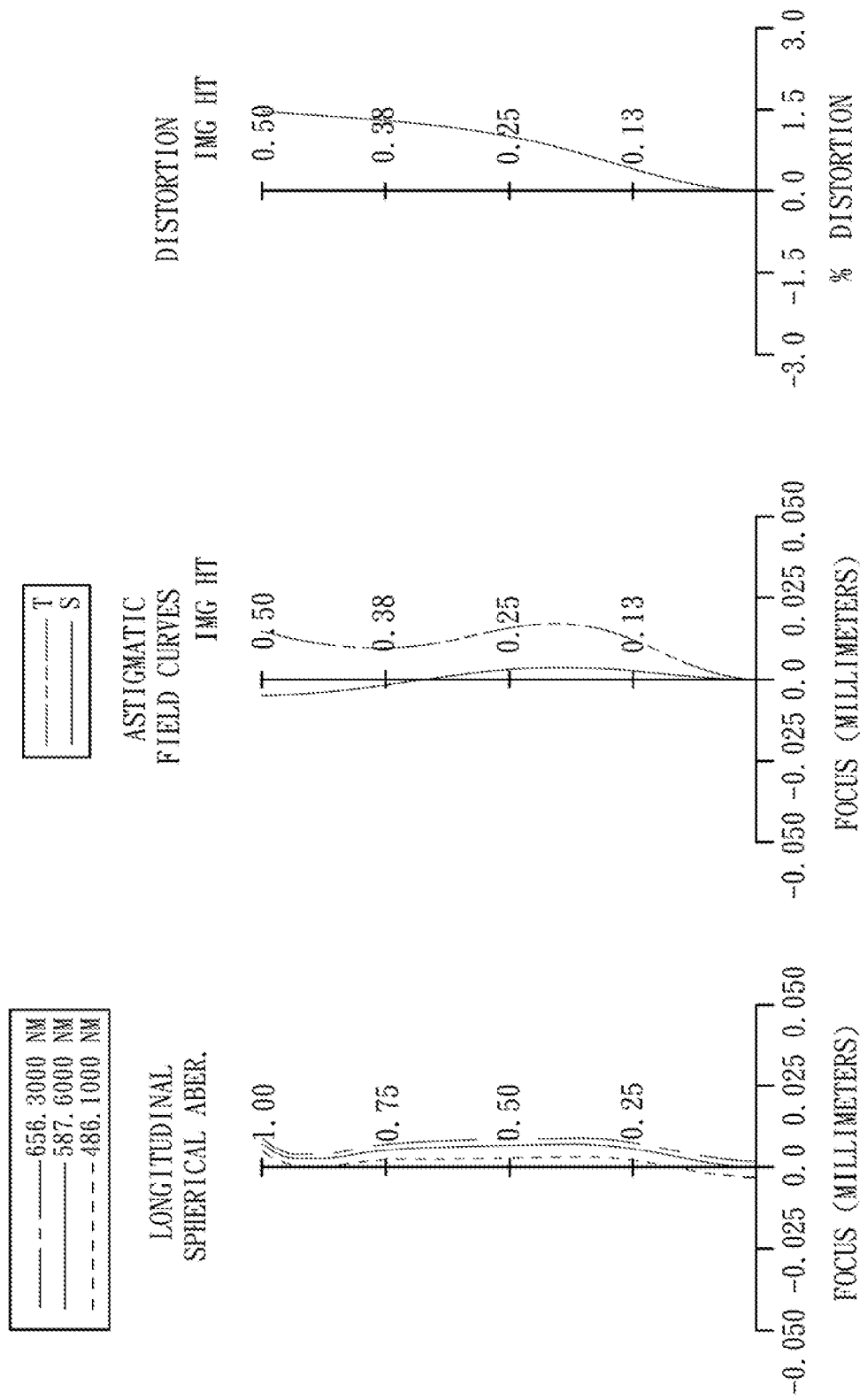
FIG. 5 shows spherical aberration curves, astigmatic field curves and a distortion curve of the optical image capturing lens system according to the 2nd embodiment.
Figure 6:
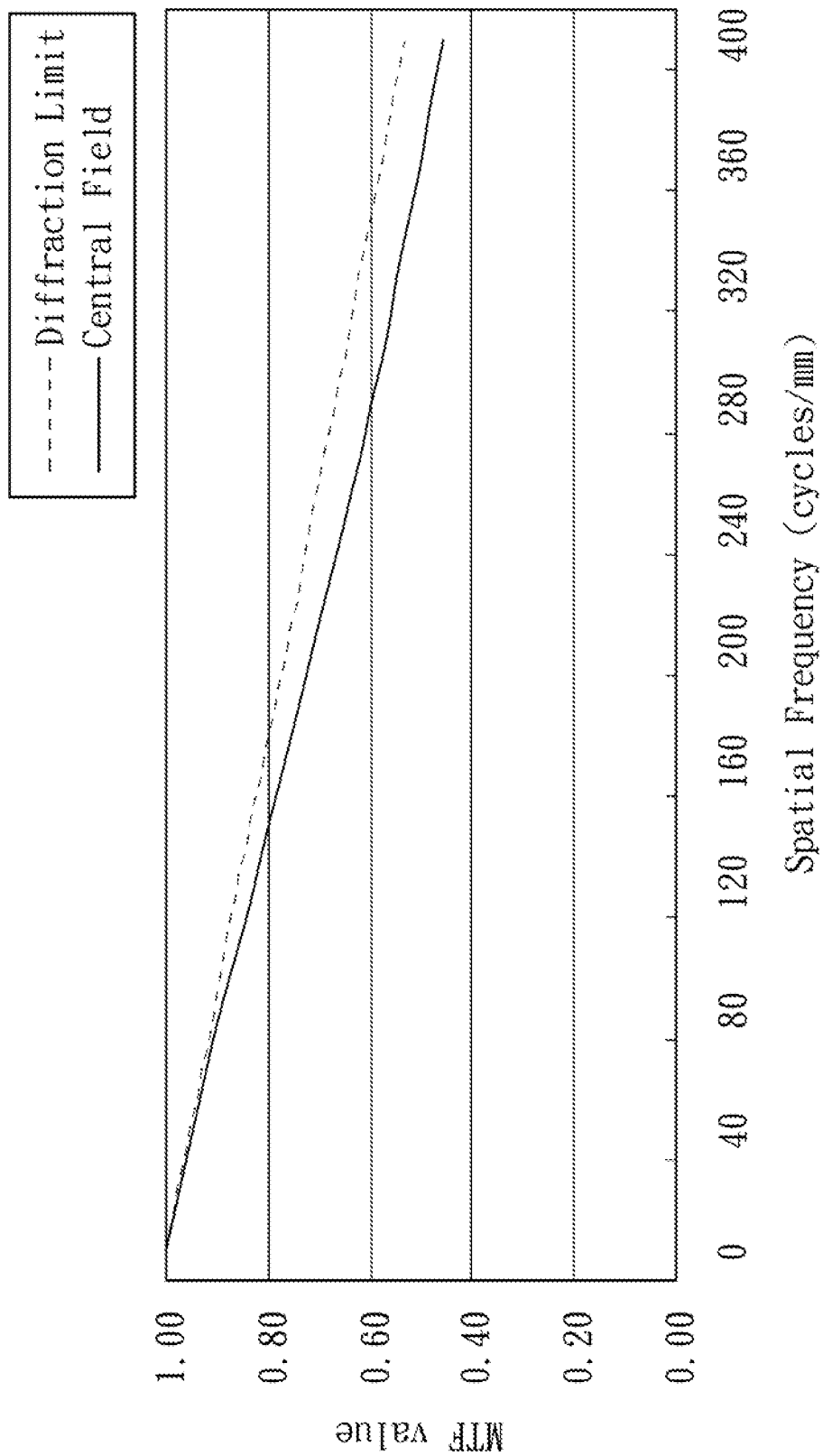
FIG. 6 shows relationship diagrams of spatial frequency-diffraction limit value and spatial frequency-field modulation transfer function value according to the 2nd embodiment.

FIG. 4 is a schematic view of an optical image capturing lens system according to the 2nd embodiment of the present disclosure. FIG. 5 shows spherical aberration curves, astigmatic field curves and a distortion curve of the optical image capturing lens system according to the 2nd embodiment. FIG. 6 shows relationship diagrams of spatial frequency-diffraction limit value and spatial frequency-field modulation transfer function value according to the 2nd embodiment. In FIG. 4, the optical image capturing lens system includes, in order from an object side to an image side, an aperture stop 200 a first lens element 210, a second lens element 220, a third lens element 230, a fourth lens element 240, an IR-filter 260, an image plane 250 and an image sensor 270.

The first lens element 210 with positive refractive power has a convex object-side surface 211 and a convex image-side surface 212, and is made of plastic material. The object-side surface 211 and the mage-side surface 212 of the first lens element 210 are aspheric.

The second lens element 220 with negative refractive power has a convex object-side surface 221 and a concave image-side surface 222, and is made of plastic material. The object-side surface 221 and the image-side surface 222 of the second lens element 220 are aspheric.

The third lens element 230 with positive refractive power has a concave object-side surface 231 and a convex image-side surface 232, and is made of plastic material. The object-side surface 231 and the image-side surface 232 to of the third lens element 230 are aspheric.

The fourth lens element 240 with positive refractive power has a convex object-side surface 241 and a concave image-side surface 242, and is made of plastic material. The object-side surface 241 and the image-side surface 242 of the fourth lens element 240 are aspheric. Furthermore, the fourth lens element 240 has inflection points formed on the object-side surface 241 and the image-side surface 242 thereof.

The IR-filter 260 is made of glass and located between the fourth lens element 240 and the image plane 250, and will not affect the focal length of the optical image capturing lens system.

The detailed optical data of the 2nd embodiment are shown in Table 4, the aspheric surface data are shown in Table 5, and the modulation transfer function (MTF) values are shown in Table 6 below

TABLE 4

2nd Embodiment
f = 1.20 mm, Fno = 1.62, HFOV = 22.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.060 | | | | |
| 2 | Lens 1 | 0.891920 (ASP) | 0.351 | Plastic | 1.544 | 55.9 | 1.01 |
| 3 | | −1.221140 (ASP) | 0.030 | | | | |
| 4 | Lens 2 | 16.758800 (ASP) | 0.200 | Plastic | 1.633 | 23.4 | −1.60 |
| 5 | | 0.952570 (ASP) | 0.108 | | | | |
| 6 | Lens 3 | −0.749860 (ASP) | 0.281 | Plastic | 1.544 | 55.9 | 2.54 |
| 7 | | −0.550410 (ASP) | 0.030 | | | | |
| 8 | Lens 4 | 0.647020 (ASP) | 0.250 | Plastic | 1.543 | 56.5 | 34.54 |
| 9 | | 0.578960 (ASP) | 0.200 | | | | |
| 10 | IR-filter | Plano | 0.210 | Glass | 1.517 | 64.2 | — |
| 11 | | Plano | 0.157 | | | | |
| 12 | Image | Plano | — | | | | |

Note:
Reference wavelength (d-line) is 587.6 nm.

TABLE 5

Aspheric Coefficients

| Surface # | | | | |
|---|---|---|---|---|
| | 2 | 3 | 4 | 5 |
| k = | −3.64060E+00 | −5.88785E+01 | −9.00000E+01 | 2.65003E+00 |
| A4 = | 7.09529E−01 | 2.85400E−01 | 1.97301E+00 | −9.66871E−01 |
| A6 = | 8.13531E−01 | −3.34238E+00 | −5.11382E+01 | −2.04165E+01 |
| A8 = | −1.18334E+01 | −5.95591E+01 | 2.48955E+02 | −7.61802E+01 |
| A10 = | 4.62463E+01 | 4.17530E+02 | −9.10502E+02 | 9.33548E+02 |
| A12 = | | | 3.04020E+03 | −1.94303E+03 |

| Surface # | | | | |
|---|---|---|---|---|
| | 6 | 7 | 8 | 9 |
| k = | −1.16580E+01 | −3.93210E+00 | −8.84492E+00 | −9.92197E−01 |
| A4 = | 1.44851E+00 | −2.27529E+00 | −1.50818E+00 | −4.61470E+00 |
| A6 = | −3.08664E+00 | 2.56370E+01 | 4.84672E+00 | 1.62681E+01 |
| A8 = | 5.19175E+01 | −6.44363E+01 | −3.45090E+01 | −5.15273E+01 |
| A10 = | −6.42607E+02 | 1.57352E+02 | 2.74110E+02 | 4.77502E+01 |
| A12 = | 2.99508E+03 | 2.22576E+03 | −1.85256E+03 | 2.58750E+02 |
| A14 = | 1.80029E+03 | −5.61531E+03 | 7.73724E+03 | −8.80357E+02 |
| A16 = | −2.77842E+04 | −2.13467E+04 | −1.42535E+04 | 6.88423E+04 |

TABLE 6

| Spatial Frequency (Cycles/mm) | Diffraction Limit Value | Central Field Modulation Transfer Function (MTF) Value |
|---|---|---|
| 0 | 1.00 | 1.00 |
| 20 | 0.98 | 0.98 |
| 40 | 0.95 | 0.95 |
| 60 | 0.93 | 0.92 |
| 80 | 0.90 | 0.89 |
| 100 | 0.88 | 0.86 |
| 120 | 0.86 | 0.83 |
| 140 | 0.83 | 0.80 |
| 160 | 0.81 | 0.77 |
| 180 | 0.79 | 0.74 |
| 200 | 0.76 | 0.71 |
| 220 | 0.74 | 0.68 |
| 240 | 0.71 | 0.65 |
| 260 | 0.69 | 0.62 |
| 280 | 0.67 | 0.60 |
| 300 | 0.64 | 0.57 |
| 320 | 0.62 | 0.55 |
| 340 | 0.60 | 0.52 |
| 360 | 0.58 | 0.50 |
| 380 | 0.55 | 0.48 |
| 400 | 0.53 | 0.46 |

In the optical image capturing lens system according to the 2nd embodiment, the definitions of f, Fno, HFOV, FOV, V1, V2, ΣCT, TTL, f4, EPS, Yc42, SD42, SDmax, SDmin, MTF400 and CRAmax are the same as those stated in the 1st embodiment with corresponding values for the 2nd embodiment. Moreover, these parameters can be calculated from Tables 4-6 as the following values and satisfy the following relationships:

| f (mm) | 1.20 | f/EPD | 1.62 |
|---|---|---|---|
| Fno | 1.62 | Yc42/SD42 | 0.45 |
| HFOV (deg.) | 22.5 | SDmax/SDmin | 1.23 |
| FOV (deg.) | 45.0 | TTL (mm) | 1.75 |
| V1/V2 | 2.39 | TTL/EPD | 2.37 |
| ΣCT/TTL | 0.62 | MTF400 | 0.46 |
| f/f4 | 0.44 | CRAmax (deg.) | 18.94 |

3rd Embodiment

Figure 7:
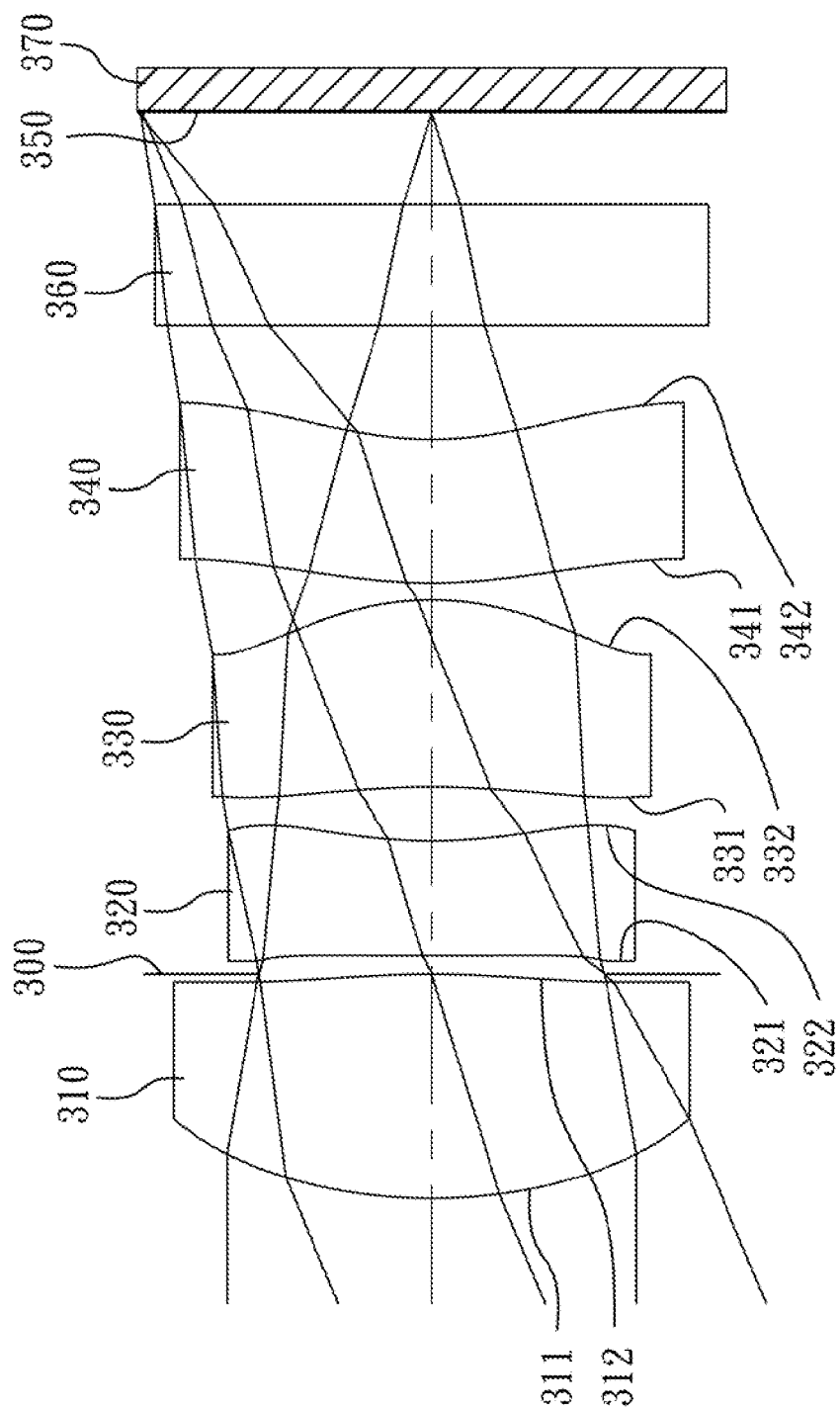
FIG. 7 is a schematic view of an optical image capturing lens system according to the 3rd embodiment of the present disclosure.
Figure 8:
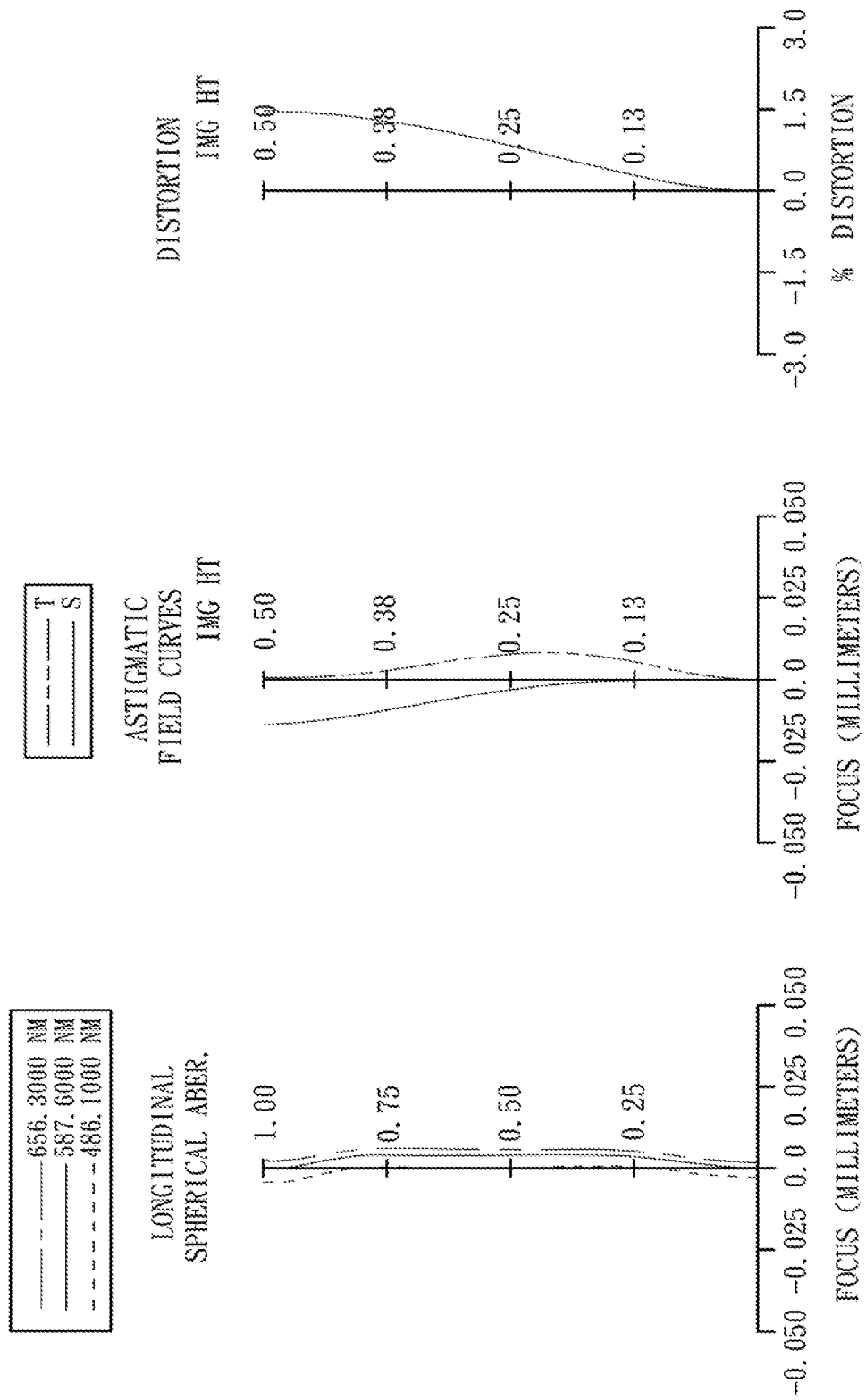
FIG. 8 shows spherical aberration curves, astigmatic field curves and a distortion curve of the optical image capturing lens system according to the 3rd embodiment.
Figure 9:
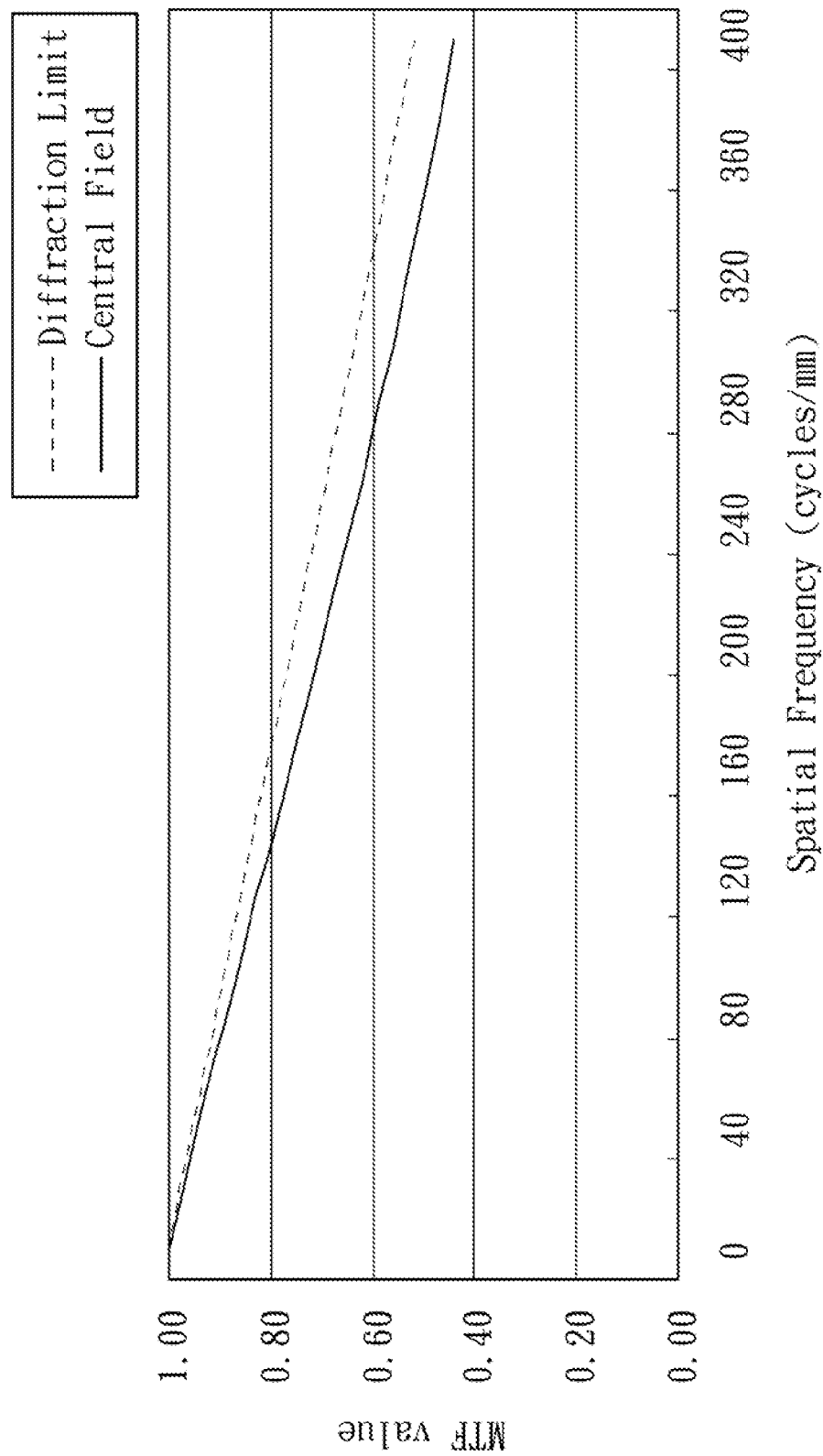
FIG. 9 shows relationship diagrams of spatial frequency-diffraction limit value and spatial frequency-field modulation transfer function value according to the 3rd embodiment.

FIG. 7 is a schematic view of an optical image capturing lens system according to the 3rd embodiment of the present disclosure. FIG. 8 shows spherical aberration curves, astigmatic field curves and a distortion curve of the optical image capturing lens system according to the 3rd embodiment. FIG. 9 shows relationship diagrams of spatial frequency-diffraction limit value and spatial frequency-field modulation transfer function value according to the 3rd embodiment. In FIG. 7, the optical image capturing lens system includes, in order from an object side to an image side, a first lens element 310, an aperture stop 300, a second lens element 320, a third lens element 330, a fourth lens element 340, an IR-filter 360, an image plane 350 and an image sensor 370.

The first lens element 310 with positive refractive power has a convex object-side surface 311 and a convex image-side surface 312, and is made of plastic material. The object-side surface 311 and the image-side surface 312 of the first lens element 310 are aspheric.

The second lens element 320 with negative refractive power has a concave object-side surface 321 and a concave image-side surface 322, and is made of plastic material. The object-side surface 321 and the image-side surface 322 of the second lens element 320 are aspheric.

The third lens element 330 with positive refractive power has a concave object-side surface 331 and a convex image-side surface 332, and is made of plastic material. The object-side surface 331 and the image-side surface 332 of the third lens element 330 are aspheric.

The fourth lens element 340 with negative refractive power has a convex object-side surface 341 and a concave image-side surface 342, and is made of plastic material. The object-side surface 341 and the image-side surface 342 of the fourth lens element 340 are aspheric. Furthermore, the fourth lens element 340 has inflection points formed on the object-side surface 341 and the image-side surface 342 thereof.

The IR-filter 360 is made of glass and located between the fourth lens element 340 and the image plane 350, and will not affect the focal length of the optical image capturing lens system.

The detailed optical data of the 3rd embodiment are shown in Table 7, the aspheric surface data are shown in Table 8, and the modulation transfer function (MTF) values are shown in Table 9 below.

TABLE 7

3rd Embodiment
f = 1.20 mm, Fno = 1.68, HFOV = 22.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.925180 (ASP) | 0.391 | Plastic | 1.544 | 55.9 | 1.10 |
| 2 | | −1.430160 (ASP) | 0.000 | | | | |
| 3 | Ape. Stop | Plano | 0.032 | | | | |
| 4 | Lens 2 | −40.000000 (ASP) | 0.200 | Plastic | 1.614 | 25.8 | −1.46 |
| 5 | | 0.920150 (ASP) | 0.095 | | | | |
| 6 | Lens 3 | −1.424860 (ASP) | 0.325 | Plastic | 1.544 | 55.9 | 1.28 |
| 7 | | −0.504770 (ASP) | 0.030 | | | | |
| 8 | Lens 4 | 0.955300 (ASP) | 0.250 | Plastic | 1.614 | 25.6 | −4.11 |
| 9 | | 0.824080 (ASP) | 0.200 | | | | |
| 10 | IR-filter | Plano | 0.210 | Glass | 1.517 | 64.2 | — |
| 11 | | Plano | 0.162 | | | | |
| 12 | Image | Plano | — | | | | |

Note:
Reference wavelength (d-line) is 587.6 nm.

TABLE 8

Aspheric Coefficients

| Surface # | 1 | 2 | 4 | 5 |
|---|---|---|---|---|
| k = | −2.81184E+00 | −8.23052E+01 | 1.00000E+00 | 3.09034E+00 |
| A4 = | 6.04175E−01 | 1.00363E+00 | 1.81349E+00 | −1.94864E+00 |
| A6 = | 5.55742E−01 | −2.37707E+00 | −4.36940E+01 | −1.36554E+01 |
| A8 = | 5.96963E+00 | 4.77583E+01 | 2.92821E+02 | 1.04588E+02 |
| A10 = | −2.20548E+00 | −4.56321E+02 | −1.68091E+03 | 6.37647E+02 |
| A12 = | | | 1.09552E+03 | −6.63861E+02 |

| Surface # | 6 | 7 | 8 | 9 |
|---|---|---|---|---|
| k = | −2.34096E+01 | −4.82813E+00 | −9.93745E+00 | −5.57020E−01 |
| A4 = | 1.28966E+00 | −2.65255E+00 | −1.06527E+00 | −3.90949E+00 |
| A6 = | −6.17414E+00 | 2.49101E+01 | 1.76224E+00 | 1.15502E+01 |
| A8 = | 6.17906E+01 | −9.13430E+01 | −2.92873E+01 | −3.86170E+01 |
| A10 = | −5.40937E+02 | 2.01058E+02 | 3.21346E+02 | 4.99400E+01 |
| A12 = | 2.63017E+03 | 3.13812E+03 | −1.87428E+03 | 2.14282E+02 |
| A14 = | 5.25999E+03 | −5.56126E+03 | 7.29761E+03 | −9.75437E+02 |
| A16 = | −4.12744E+04 | −2.41540E+04 | −1.43811E+04 | 9.42655E+02 |

TABLE 9

| Spatial Frequency (Cycles/mm) | Diffraction Limit Value | Central Field Modulation Transfer Function (MTF) Value |
|---|---|---|
| 0 | 1.00 | 1.00 |
| 20 | 0.98 | 0.97 |
| 40 | 0.95 | 0.94 |
| 60 | 0.93 | 0.92 |
| 80 | 0.90 | 0.88 |
| 100 | 0.88 | 0.85 |
| 120 | 0.85 | 0.82 |
| 140 | 0.83 | 0.79 |
| 160 | 0.80 | 0.76 |
| 180 | 0.78 | 0.73 |
| 200 | 0.75 | 0.70 |
| 220 | 0.73 | 0.67 |
| 240 | 0.71 | 0.64 |
| 260 | 0.68 | 0.61 |
| 280 | 0.66 | 0.59 |
| 300 | 0.63 | 0.56 |
| 320 | 0.61 | 0.53 |
| 340 | 0.59 | 0.51 |
| 360 | 0.56 | 0.49 |
| 380 | 0.54 | 0.46 |
| 400 | 0.52 | 0.44 |

In the optical image capturing lens system according to the 3rd embodiment, the definitions of f, Fno, HFOV, FOV, V1, V2, ΣCT, TTL, f4, EPD, Yc42, SD42. SDmax, SDmin, MTF400 and CRAmax are the same as those stated in the 1st embodiment with corresponding values for the 3rd embodiment. Moreover, these parameters can be calculated from Tables 7-9 as the following values and satisfy the following relationships:

| f (mm) | 1.20 | f/EPD | 1.68 |
| --- | --- | --- | --- |
| Fno | 1.68 | Yc42/SD42 | 0.52 |
| HFOV (deg.) | 22.5 | SDmax/SDmin | 1.48 |
| FOV (deg.) | 45.0 | TTL (mm) | 1.83 |
| V1/V2 | 2.18 | TTL/EPD | 2.56 |
| ΣCT/TTL | 0.64 | MTF400 | 0.44 |
| f/f4 | −0.29 | CRAmax (deg.) | 22.60 |

4th Embodiment

Figure 10:
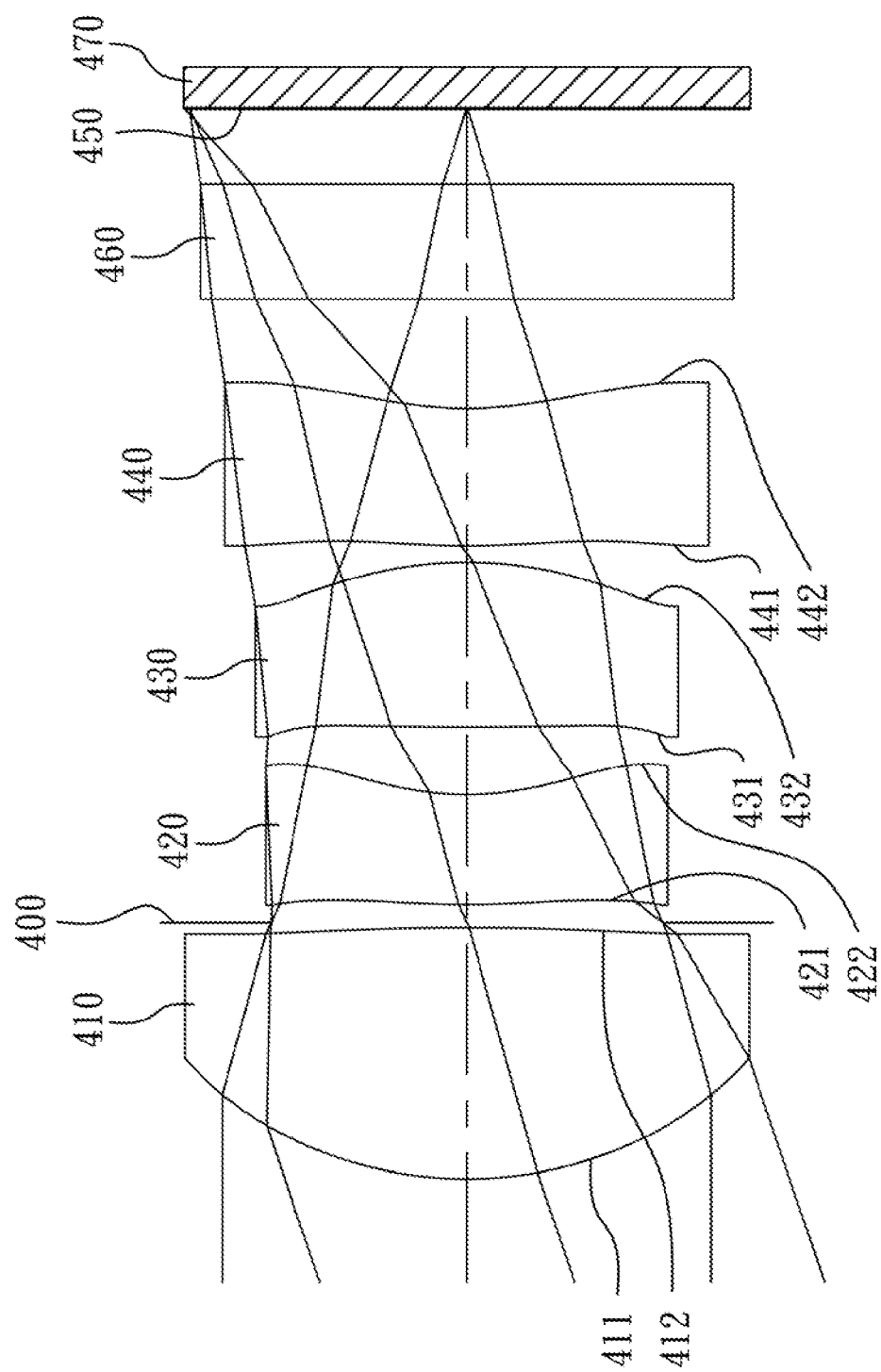
FIG. 10 is a schematic view of an optical image capturing lens system according to the 4th embodiment of the present disclosure.
Figure 11:
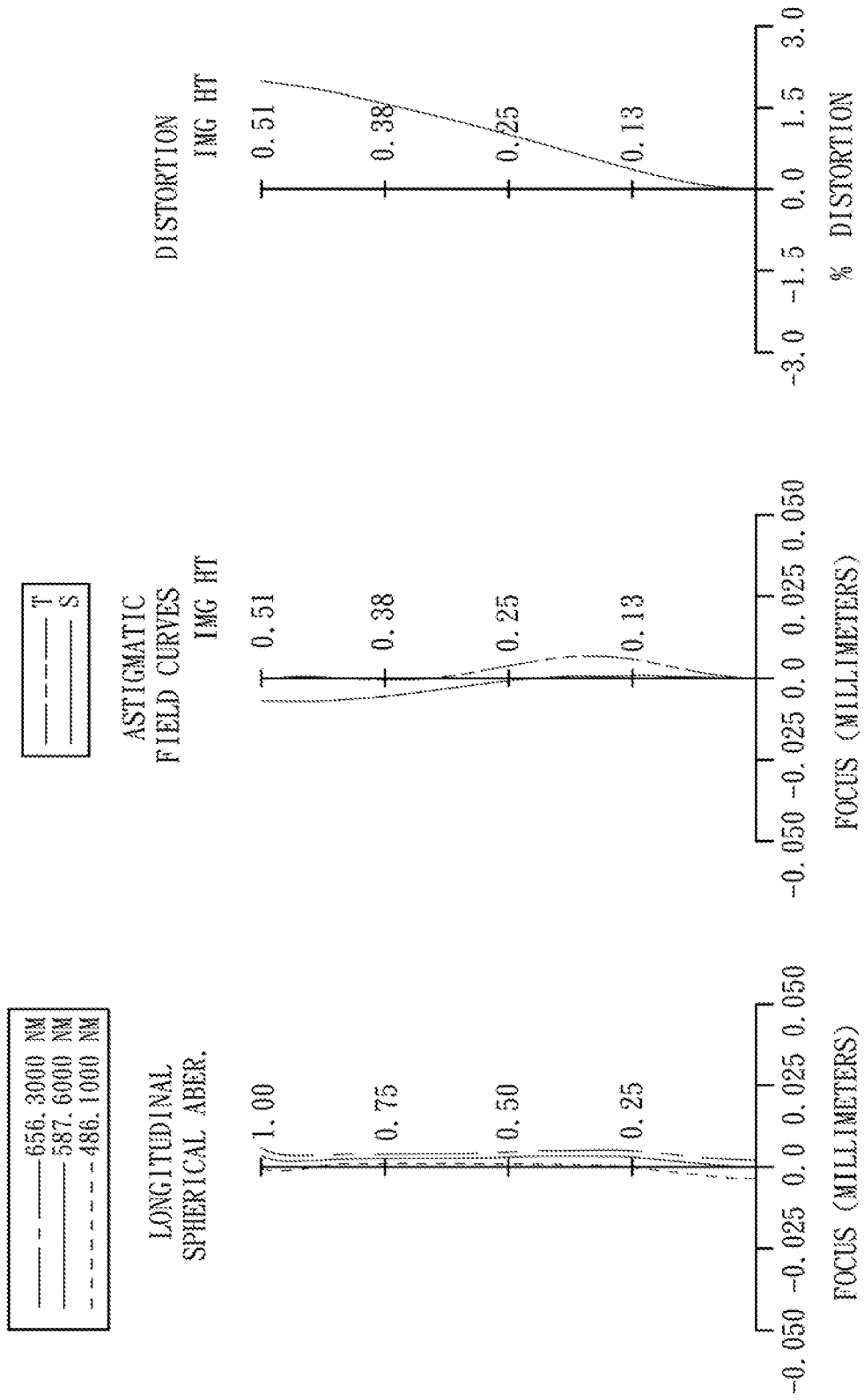
FIG. 11 shows spherical aberration curves, astigmatic field curves and a distortion curve of the optical image capturing lens system according to the 4th embodiment.
Figure 12:
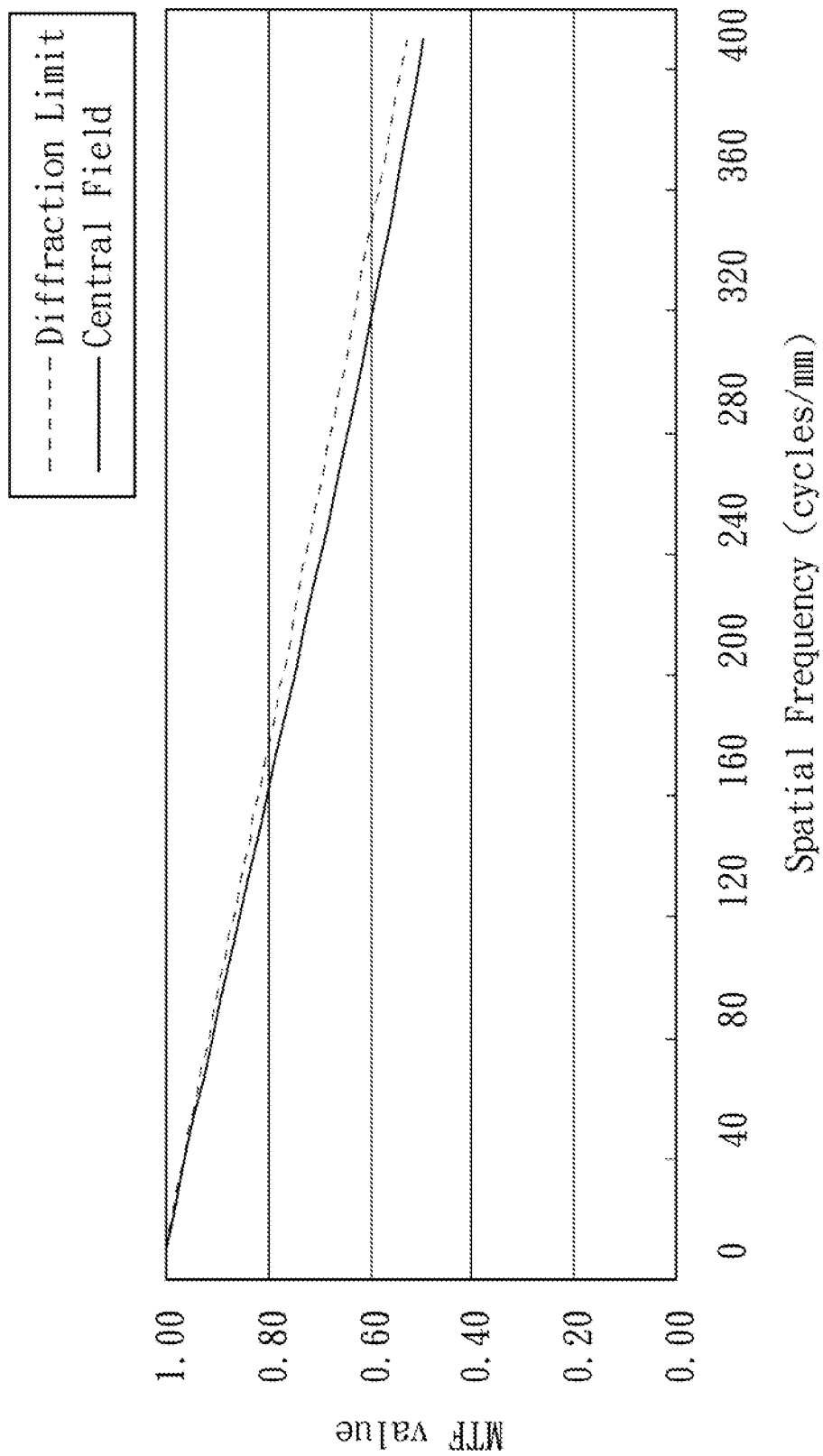
FIG. 12 shows relationship diagrams of spatial frequency-diffraction limit value and spatial frequency-field modulation transfer function value according to the 4th embodiment.

FIG. 10 is a schematic view of an optical image capturing lens system according to the 4th embodiment of the present disclosure. FIG. 11 shows spherical aberration curves, astigmatic field curves and a distortion curve of the optical image capturing lens system according to the 4th embodiment. FIG. 12 shows relationship diagrams of spatial frequency-diffraction limit value and spatial frequency-field modulation transfer function value according to the 4th embodiment. In FIG. 10, the optical image capturing lens system includes, in order from an object side to an image side, a first lens element 410, an aperture stop 400, a second lens element 420, a third lens element 430, a fourth lens element 440, an IR-filter 460, an image plane 450 and an image sensor 470.

The first lens element 410 with positive refractive power has a convex object-side surface 411 and a convex image-side surface 412, and is made of plastic material. The object-side surface 411 and the image-side surface 412 of the first lens element 410 are aspheric.

The second lens element 420 with negative refractive power has a convex object-side surface 421 and a concave image-side surface 422, and is made of plastic material. The object-side surface 421 and the image-side surface 422 of the second lens element 420 are aspheric.

The third lens element 430 with positive refractive power has a convex object-side surface 431 and a convex image-side surface 432, and is made of plastic material. The object-side surface 431 and the image-side surface 432 of the third lens element 430 are aspheric.

The fourth lens element 440 with negative refractive power has a convex object-side surface 441 and a concave image-side surface 442, and is made of plastic material. The object-side surface 441 and the image-side surface 442 of the fourth lens element 440 are aspheric. Furthermore, the fourth lens element 440 has inflection points formed on the object-side surface 441 and the image-side surface 442 thereof.

The IR-filter 460 is made of glass and located between the fourth lens element 440 and the image plane 450, and will not affect the focal length of the optical image capturing lens system.

The detailed optical data of the 4th embodiment are shown in Table 10, the aspheric surface data are shown in Table 11, and the modulation transfer function (MTF) values are shown in Table 12 below.

TABLE 10

4th Embodiment
f = 1.47 mm, Fno = 1.65, HFOV = 18.6 deg.

| Surface # | | Curvature Radius | Thickness | Material | Index | Abbe # | Focal length |
| --- | --- | --- | --- | --- | --- | --- | --- |
| 0 | Object | Plano | Infinity | | | | |
| 1 | Lens 1 | 0.741970 (ASP) | 0.457 | Plastic | 1.544 | 55.9 | 1.23 |
| 2 | | −5.196800 (ASP) | 0.009 | | | | |
| 3 | Ape. Stop | Plano | 0.033 | | | | |
| 4 | Lens 2 | 1.759630 (ASP) | 0.200 | Plastic | 1.633 | 23.4 | −1.30 |
| 5 | | 0.536430 (ASP) | 0.124 | | | | |
| 6 | Lens 3 | 10.752700 (ASP) | 0.299 | Plastic | 1.544 | 55.9 | 1.28 |
| 7 | | −0.738420 (ASP) | 0.030 | | | | |
| 8 | Lens 4 | 1.437440 (ASP) | 0.250 | Plastic | 1.544 | 55.9 | −2.87 |
| 9 | | 0.702860 (ASP) | 0.200 | | | | |
| 10 | IR-filter | Plano | 0.210 | Glass | 1.517 | 64.2 | — |
| 11 | | Plano | 0.137 | | | | |
| 12 | Image | Plano | — | | | | |

Note:
Reference wavelength (d-line) is 587.6 nm.

TABLE 11

Aspheric Coefficients

| Surface # | 1 | 2 | 4 | 5 |
| --- | --- | --- | --- | --- |
| k= | −2.03417E+00 | −5.59120E+01 | −9.00000E+01 | −5.05815E−01 |
| A4= | 6.83587E−01 | 4.09601E−02 | −5.65197E−01 | −3.15885E+00 |
| A6= | 2.04679E−01 | −2.76382E+00 | −2.41850E+01 | −1.06163E+01 |
| A8= | −2.35422E−01 | 4.13961E+01 | 2.38185E+02 | 3.25438E+01 |
| A10= | 7.42810E+00 | −1.40488E+02 | −9.73210E+02 | −3.26891E+02 |
| A12= | | | 1.09552E+03 | 9.16636E+02 |

| Surface # | 6 | 7 | 8 | 9 |
| --- | --- | --- | --- | --- |
| k= | 1.00000E+00 | −1.18968E+00 | −8.75233E+01 | −2.82274E+00 |
| A4= | 1.04667E+00 | −1.05557E+00 | −1.69576E+00 | −3.07577E+00 |
| A6= | −1.86089E+01 | 2.32261E+01 | −2.14394E+00 | 8.67727E+00 |

TABLE 11-continued

Aspheric Coefficients

| A8= | 1.15664E+01 | −1.87777E+02 | 2.26124E+01 | −8.52278E+00 |
|---|---|---|---|---|
| A10= | −4.53109E+02 | 5.47360E+02 | 2.80324E+02 | −6.81229E+01 |
| A12= | 2.76000E+03 | 3.09133E+03 | −2.02640E+03 | 2.08063E+02 |
| A14= | 5.28496E+03 | −5.56619E+03 | 6.87203E+03 | 2.12785E+02 |
| A16= | −4.12744E+04 | −2.41540E−04 | −1.36700E+04 | −1.23214E+03 |

TABLE 12

| Spatial Frequency (Cycles/mm) | Diffraction Limit Value | Central Field Modulation Transfer Function (MTF) Value |
|---|---|---|
| 0 | 1.00 | 1.00 |
| 20 | 0.98 | 0.98 |
| 40 | 0.95 | 0.95 |
| 60 | 0.93 | 0.92 |
| 80 | 0.90 | 0.90 |
| 100 | 0.88 | 0.87 |
| 120 | 0.85 | 0.84 |
| 140 | 0.83 | 0.82 |
| 160 | 0.80 | 0.79 |
| 180 | 0.78 | 0.76 |
| 200 | 0.76 | 0.74 |
| 220 | 0.73 | 0.71 |
| 240 | 0.71 | 0.68 |
| 260 | 0.69 | 0.66 |
| 280 | 0.66 | 0.63 |
| 300 | 0.64 | 0.61 |
| 320 | 0.62 | 0.58 |
| 340 | 0.59 | 0.56 |
| 360 | 0.57 | 0.54 |
| 380 | 0.55 | 0.52 |
| 400 | 0.52 | 0.49 |

In the optical image capturing lens system according to the 4th embodiment, the definitions of f, Fno, HFOV, FOV, V1, V2, ΣCT, TTL, f4, EPD, Yc42, SD42, SDmax, SDmin, MTF400 and CRAmax are the same as those stated in the 1st embodiment with corresponding values for the 4th embodiment. Moreover, these parameters can be calculated from Tables 10-12 as the following values and satisfy the following relationships:

| f (mm) | 1.47 | f/EPD | 1.65 |
|---|---|---|---|
| Fno | 1.65 | Yc42/SD42 | 0.47 |
| HFOV (deg.) | 18.6 | SDmax/SDmin | 1.45 |
| FOV (deg.) | 37.2 | TTL (mm) | 1.88 |
| V1/V2 | 2.39 | TTL/EPD | 2.11 |
| Σ CT/TTL | 0.64 | MTF400 | 0.49 |
| f/f4 | −0.51 | CRAmax (deg.) | 24.27 |

5th Embodiment

Figure 13:
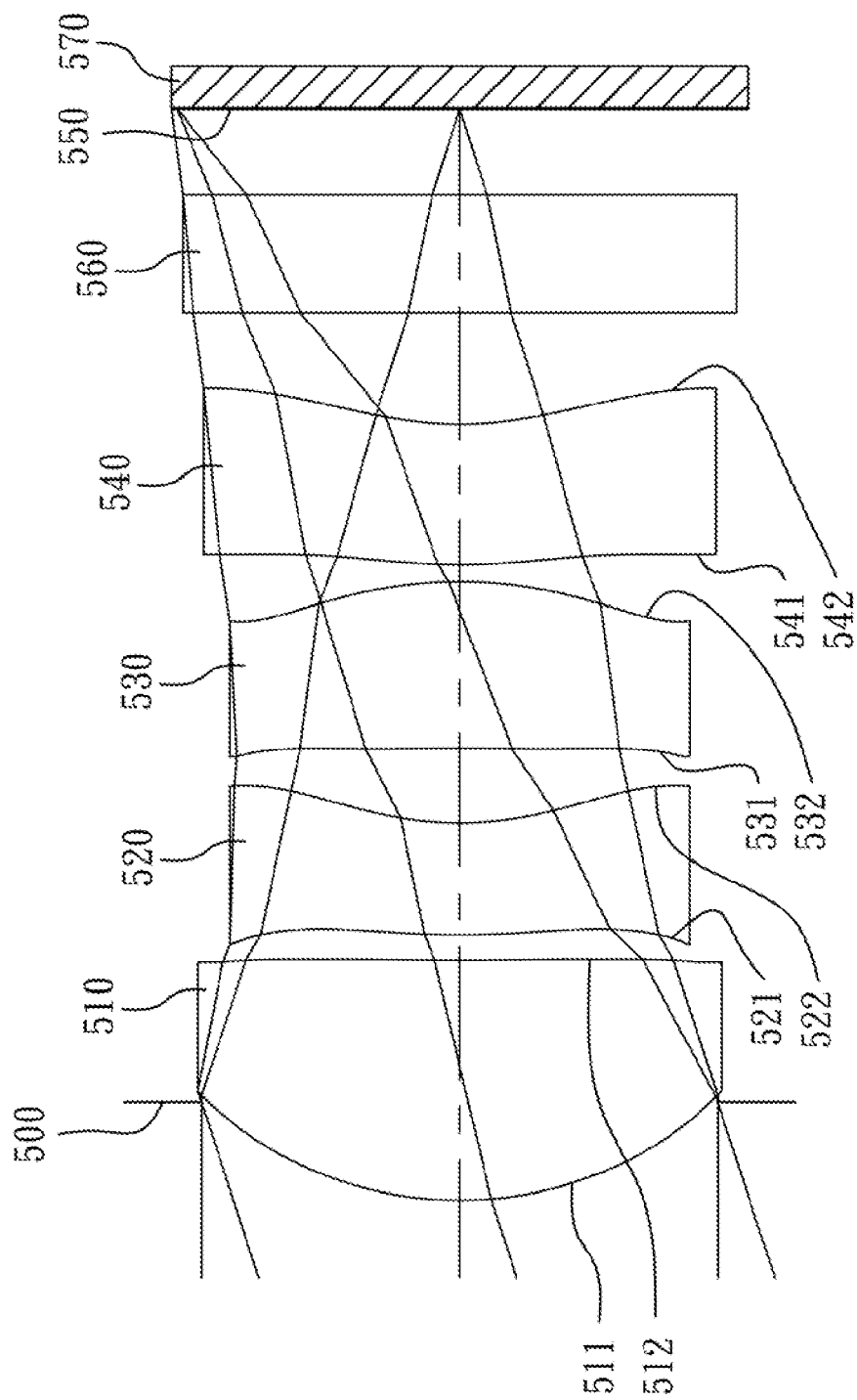
FIG. 13 is a schematic view of an optical image capturing lens system according to the 5th embodiment of the present disclosure.
Figure 14:
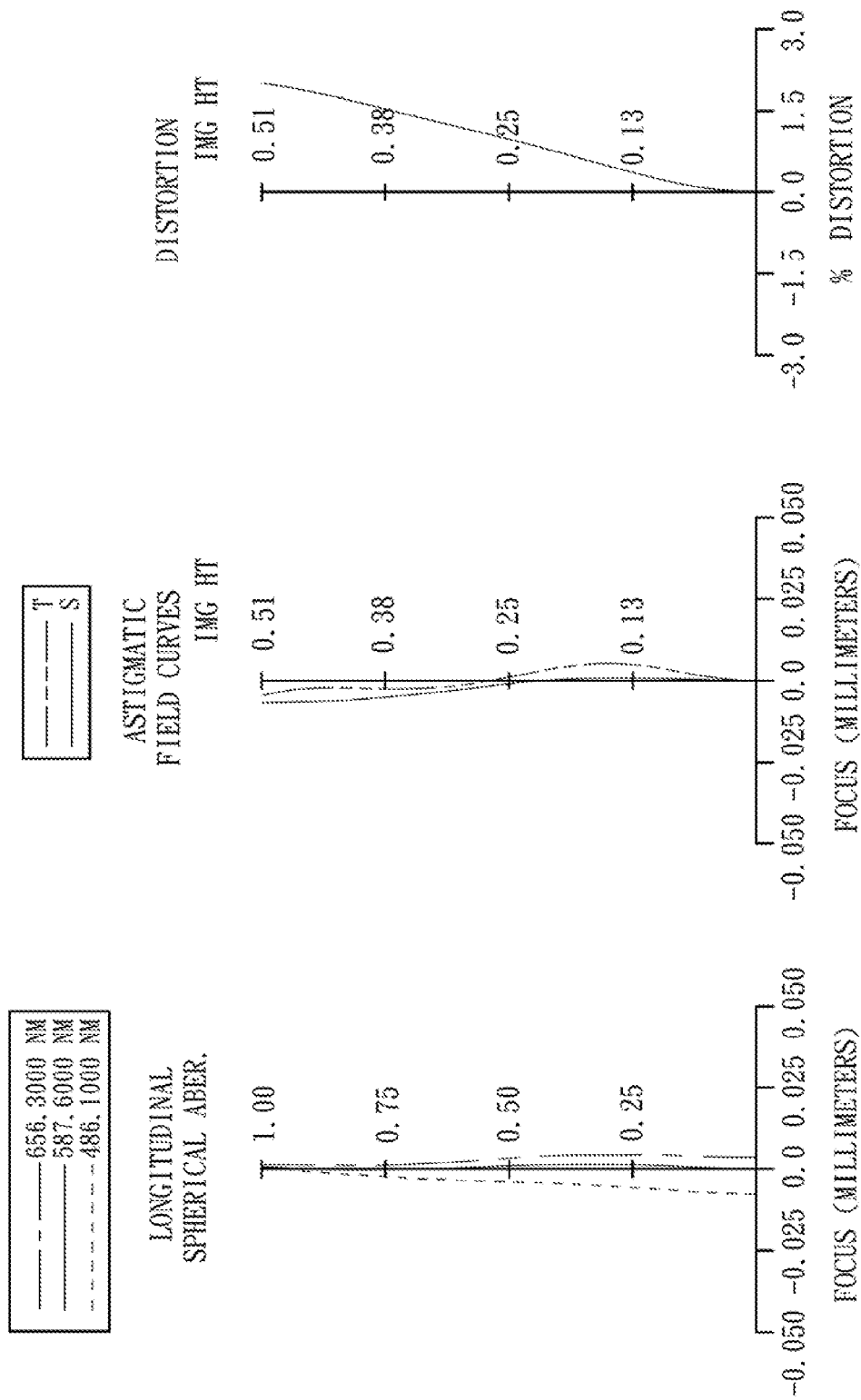
FIG. 14 shows spherical aberration curves, astigmatic field curves and a distortion curve of the optical image capturing lens system according to the 5th embodiment.
Figure 15:
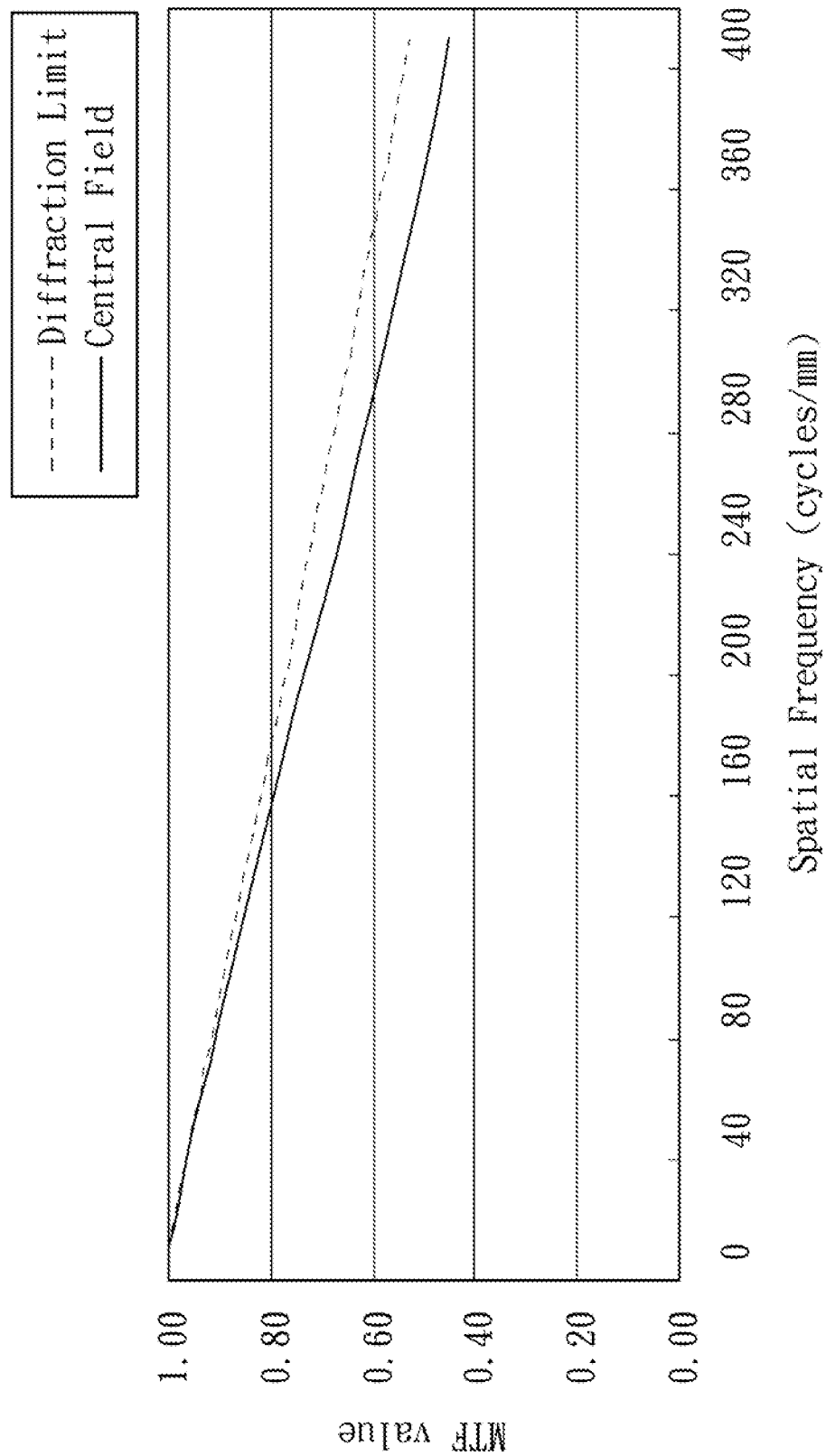
FIG. 15 shows relationship diagrams of spatial frequency-diffraction limit value and spatial frequency-field modulation transfer function value according to the 5th embodiment.

FIG. 13 is a schematic view of an optical image capturing lens system according to the 5th embodiment of the present disclosure. FIG. 14 shows spherical aberration curves, astigmatic field curves and a distortion curve of the optical image capturing lens system according to the 5th embodiment. FIG. 15 shows relationship diagrams of spatial frequency-diffraction limit value and spatial frequency-field modulation transfer function value according to the 5th embodiment. In FIG. 13, the optical image capturing lens system includes, in to order from an object side to an image side, an aperture stop 500, a first lens element 510, a second lens element 520, a third lens element 530, a fourth lens element 540, an IR-filter 560, an image plane 550 and an image sensor 570.

The first lens element 510 with positive refractive power has a convex object-side surface 511 and a concave image-side surface 512, and is made of plastic material. The object-side surface 511 and the image-side surface 512 of the first lens element 510 are aspheric.

The second lens element 520 with negative refractive power has a convex object-side surface 521 and a concave image-side surface 522, and is made of plastic material. The object-side surface 521 and the image-side surface 522 of the second lens element 520 are aspheric.

The third lens element 530 with positive refractive power has a concave object-side surface 531 and a convex image-side surface 532, and is made of plastic material. The object-side surface 531 and the image-side surface 532 of the third lens element 530 are aspheric.

The fourth lens element 540 with negative refractive power has a convex object-side surface 541 and a concave image-side surface 542, and is made of plastic material. The object-side surface 541 and the image-side surface 542 of the fourth lens element 540 are aspheric. Furthermore, the fourth lens element 540 has inflection points formed on the object-side surface 541 and the to image-side surface 542 thereof.

The IR-filter 560 is made of glass and located between the fourth lens element 540 and the image plane 550, and will not affect the focal length of the optical image capturing lens system.

The detailed optical data of the 5th embodiment are shown in Table 13, the aspheric surface data are shown in Table 14, and the modulation transfer function (MTF) values are shown in Table 15 below.

TABLE 13

5th Embodiment
f = 1.52 mm, Fno = 1.65, HFOV = 18.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.174 | | | | |
| 2 | Lens 1 | 0.684720 (ASP) | 0.428 | Plastic | 1.535 | 56.3 | 1.38 |
| 3 | | 7.575800 (ASP) | 0.045 | | | | |
| 4 | Lens 2 | 1.432790 (ASP) | 0.200 | Plastic | 1.634 | 23.8 | −1.77 |
| 5 | | 0.595990 (ASP) | 0.134 | | | | |
| 6 | Lens 3 | −6.845900 (ASP) | 0.297 | Plastic | 1.535 | 56.3 | 1.61 |
| 7 | | −0.774500 (ASP) | 0.030 | | | | |
| 8 | Lens 4 | 1.047380 (ASP) | 0.251 | Plastic | 1.535 | 56.3 | −3.43 |

TABLE 13-continued

5th Embodiment
f = 1.52 mm, Fno = 1.65, HFOV = 18.0 deg.

| Surface # | | Curvature Radius | Thickness | Material | Index | Abbe # | Focal length |
|---|---|---|---|---|---|---|---|
| 9 | | 0.610710 (ASP) | 0.200 | | | | |
| 10 | IR-filter | Plano | 0.210 | Glass | 1.517 | 64.2 | — |
| 11 | | Plano | 0.154 | | | | |
| 12 | Image | Plano | — | | | | |

Note:
Reference wavelength (d-line) is 587.6 nm.

TABLE 14

Aspheric Coefficients

| Surface # | 2 | 3 | 4 | 5 |
|---|---|---|---|---|
| k= | −1.74394E+00 | −3.10234E+01 | −4.30700E+01 | 1.97778E−01 |
| A4= | 7.67855E−01 | −6.12879E−01 | −8.70935E−01 | −2.07636E+00 |
| A6= | 2.85173E−01 | −2.42817E+00 | −2.50827E+01 | −1.74091E+01 |
| A8= | 1.08695E+00 | 5.31112E+01 | 2.38105E+02 | 8.77537E+01 |
| A10= | 9.14077E+00 | −1.97787E+02 | −1.00108E+03 | −4.24790E+02 |
| A12= | | | 1.42907E+03 | 1.05604E+03 |

| Surface # | 6 | 7 | 8 | 9 |
|---|---|---|---|---|
| k= | 1.00000E+00 | −1.53228E+00 | −3.57506E+01 | −1.85267E−01 |
| A4= | 2.11505E+00 | −8.49836E−01 | −1.39141E+00 | −4.47183E+00 |
| A6= | −1.76472E+01 | 2.56900E+01 | −2.91471E−01 | 1.11808E+01 |
| A8= | 5.52577E+01 | −1.81060E+02 | 2.73154E+00 | −1.97633E+01 |
| A10= | −6.10107E+02 | 3.65699E+02 | 2.52257E+02 | −3.54937E+01 |
| A12= | 2.76000E+03 | 3.04864E+03 | −1.82728E+03 | 1.81577E+02 |
| A14= | 5.26496E+03 | −5.56619E−03 | 7.65952E+03 | −3.90419E+01 |
| A16= | −4.12744E+04 | −2.41540E+04 | −1.61253E+04 | −6.37895E+02 |

TABLE 15

| Spatial Frequency (Cycles/mm) | Diffraction Limit Value | Central Field Modulation Transfer Function (MTF) Value |
|---|---|---|
| 0 | 1.00 | 1.00 |
| 20 | 0.98 | 0.98 |
| 40 | 0.95 | 0.95 |
| 60 | 0.93 | 0.92 |
| 80 | 0.90 | 0.90 |
| 100 | 0.88 | 0.87 |
| 120 | 0.85 | 0.84 |
| 140 | 0.83 | 0.81 |
| 160 | 0.81 | 0.78 |
| 180 | 0.78 | 0.75 |
| 200 | 0.76 | 0.72 |
| 220 | 0.73 | 0.69 |
| 240 | 0.71 | 0.66 |
| 260 | 0.69 | 0.63 |
| 280 | 0.66 | 0.60 |
| 300 | 0.64 | 0.57 |
| 320 | 0.62 | 0.55 |
| 340 | 0.59 | 0.52 |
| 360 | 0.57 | 0.50 |
| 380 | 0.55 | 0.47 |
| 400 | 0.53 | 0.45 |

In the optical image capturing lens system according to the 5th embodiment, the definitions of f, Fno, HFOV, FOV, V1, V2, ΣCT, TTL, f4, EPD, Yc42, SD42, SDmax, SDmin, MTF400 and CRAmax are the same as those stated in the 1st embodiment with corresponding values for the 5th embodiment. Moreover, these parameters can be calculated from Tables 13-15 as the following values and satisfy the following relationships:

| f (mm) | 1.52 | f/EPD | 1.65 |
|---|---|---|---|
| Fno | 1.65 | Yc42/SD42 | 0.48 |
| HFOV (deg.) | 18.0 | SOmax/SDmin | 1.17 |

-continued

| FOV (deg.) | 36.0 | TTL (mm) | 1.88 |
|---|---|---|---|
| V1/V2 | 2.37 | TTL/EPD | 2.04 |
| Σ CT/TTL | 0.63 | MTF400 | 0.45 |
| f/f4 | −0.44 | CRAmax (deg.) | 22.23 |

6th Embodiment

Figure 16:
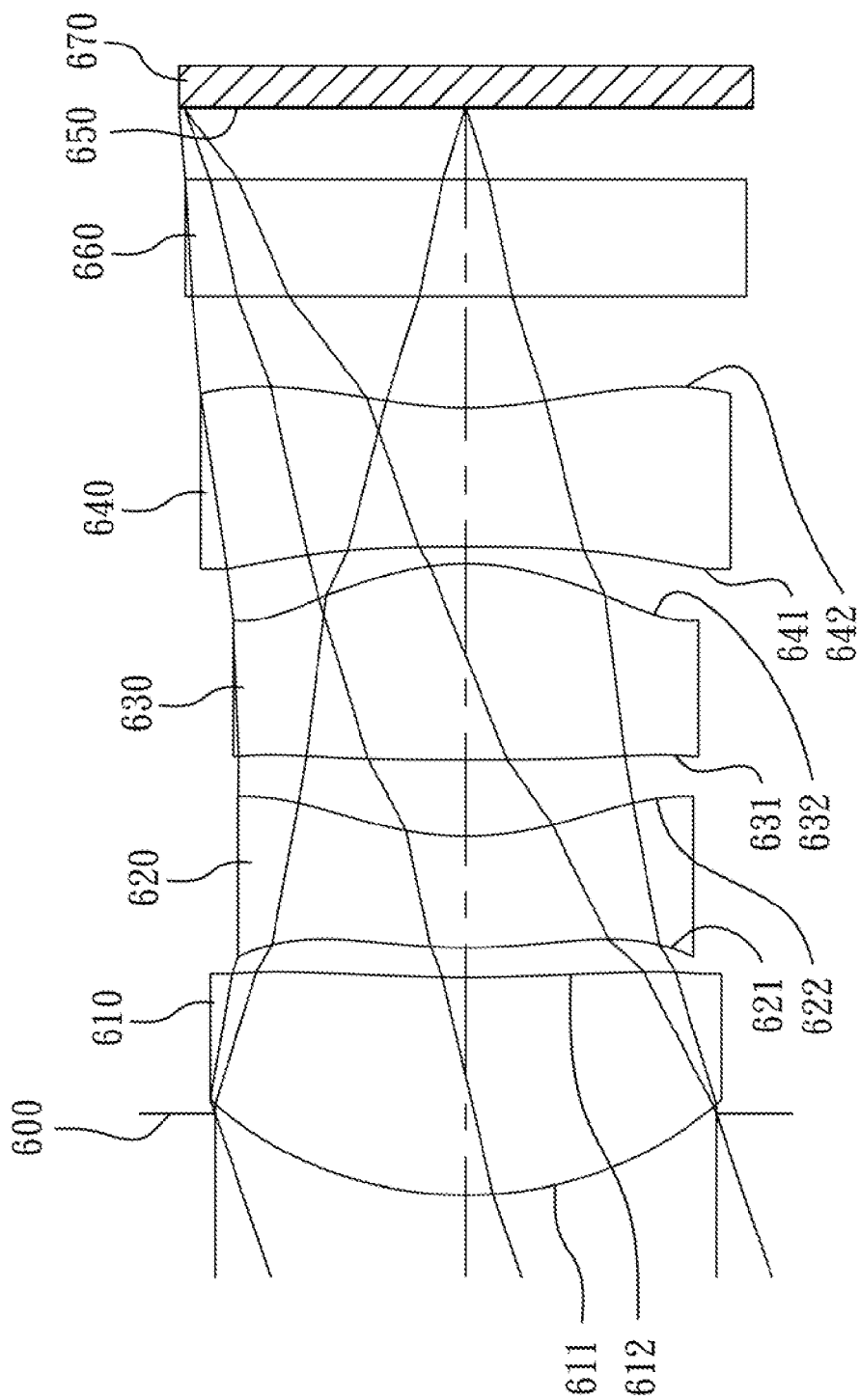
FIG. 16 is a schematic view of an optical image capturing lens system according to the 6th embodiment of the present disclosure.
Figure 17:
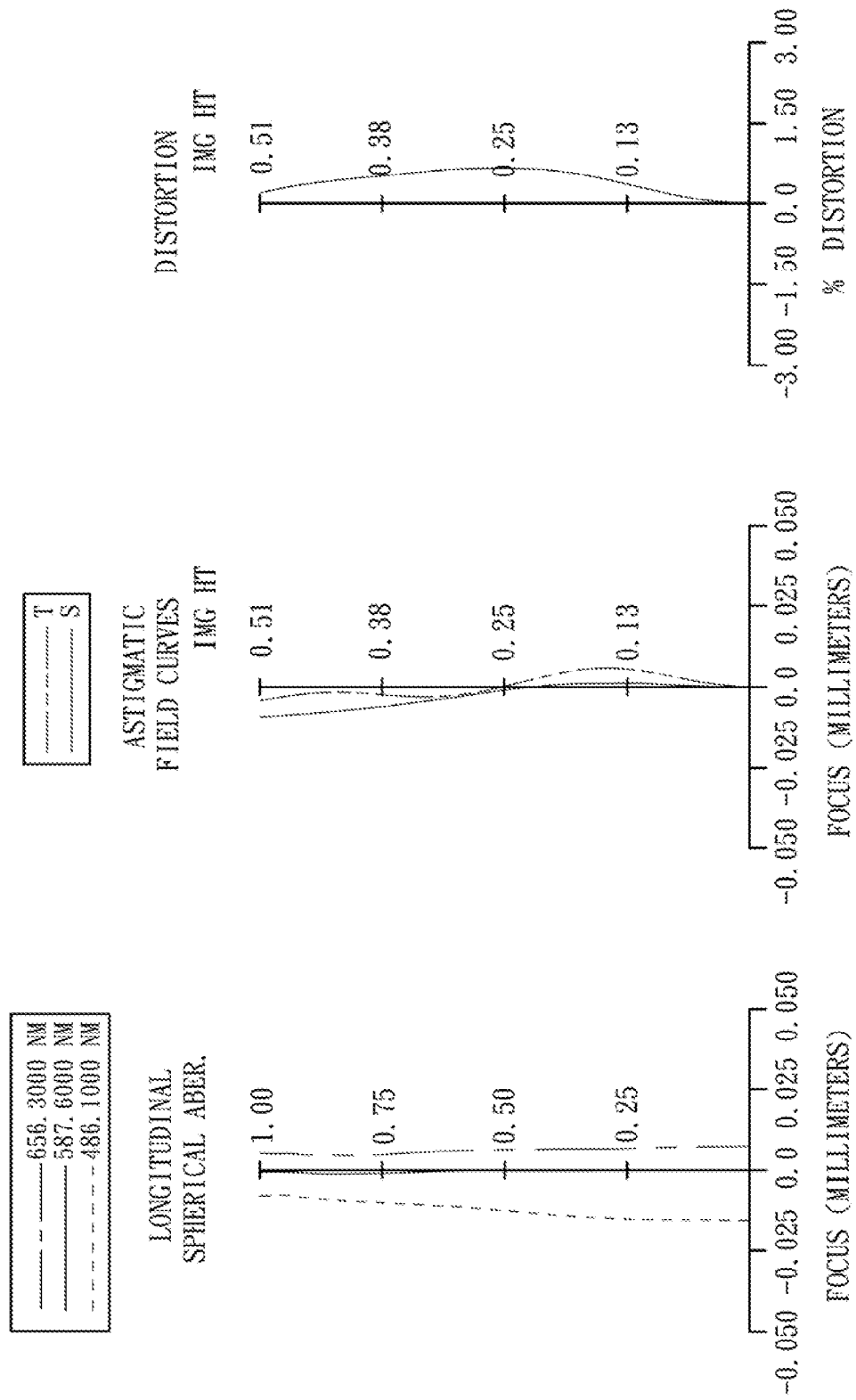
FIG. 17 shows spherical aberration curves, astigmatic field curves and a distortion curve of the optical image capturing lens system according to the 6th embodiment.
Figure 18:
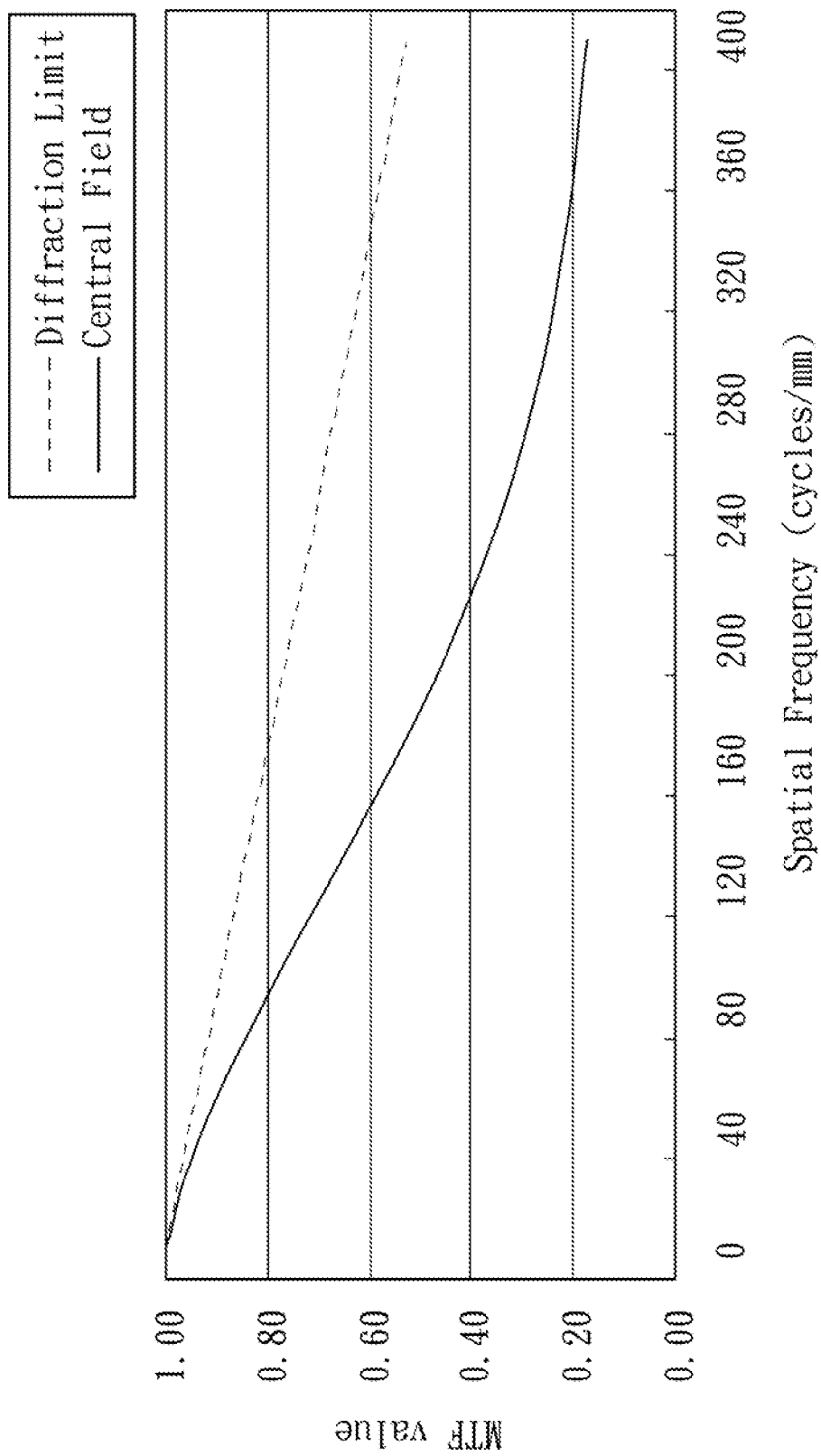
FIG. 18 shows relationship diagrams of spatial frequency-diffraction limit value and spatial frequency-field modulation transfer function value according to the 6th embodiment.

FIG. 16 is a schematic view of an optical image capturing lens system according to the 6th embodiment of the present disclosure. FIG. 17 shows spherical aberration curves, astigmatic field curves and a distortion curve of the optical image capturing lens system according to the 6th embodiment. FIG. 18 shows relationship diagrams of spatial frequency-diffraction limit value and spatial frequency-field modulation transfer function value according to the 6th embodiment. In FIG. 16, the optical image capturing lens system includes, in order from an object side to an image side, an aperture stop 600, a first lens element 610, a second lens element 620, a third lens element 630, a fourth lens element 640, an IR-filter 660, an image plane 650 and an image sensor 670.

The first lens element 610 with positive refractive power has a convex object-side surface 611 and a concave image-side surface 612, and is made of glass. The object-side surface 611 and the image-side surface 612 of the first lens element 610 are aspheric.

The second lens element 620 with negative refractive power has a convex object-side surface 621 and a concave image-side surface 622, and is made of plastic material. The object-side surface 621 and the image-side surface 622 of the second lens element 620 are aspheric.

The third lens element 630 with positive refractive power has a convex object-side surface 631 and a convex image-side surface 632, and is made of plastic material. The object-side surface 631 and the image-side surface 632 of the third lens element 630 are aspheric.

The fourth lens element 640 with negative refractive power has a concave object-side surface 641 and a concave image-side surface 642, and is made of plastic material. The object-side surface 641 and the image-side surface 642 of the fourth lens element 640 are aspheric. Furthermore, the fourth lens element 640 has inflection points formed on the object-side surface 641 and the image-side surface 642 thereof.

The IR-filter 660 is made of glass and located between the fourth lens element 640 and the image plane 650, and will not affect the focal length of the optical image capturing lens system.

The detailed optical data of the 6th embodiment are shown in Table 16, the aspheric surface data are shown in Table 17, and the modulation transfer function (MTF) values are shown in Table 18 below.

TABLE 16

6th Embodiment
f = 1.48 mm, Fno = 1.65, HFOV = 18.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.145 | | | | |
| 2 | Lens 1 | 0.735980 (ASP) | 0.390 | Glass | 1.603 | 38.0 | 1.55 |
| 3 | | 2.735220 (ASP) | 0.053 | | | | |
| 4 | Lens 2 | 1.084570 (ASP) | 0.200 | Plastic | 1.650 | 21.4 | −2.13 |
| 5 | | 0.564360 (ASP) | 0.138 | | | | |
| 6 | Lens 3 | 31.154400 (ASP) | 0.351 | Plastic | 1.535 | 56.3 | 0.84 |
| 7 | | −0.454410 (ASP) | 0.030 | | | | |
| 8 | Lens 4 | −4.724400 (ASP) | 0.250 | Plastic | 1.535 | 56.3 | −1.14 |
| 9 | | 0.712510 (ASP) | 0.200 | | | | |
| 10 | IR-filter | Plano | 0.210 | Glass | 1.517 | 64.2 | — |
| 11 | | Plano | 0.128 | | | | |
| 12 | Image | Plano | — | | | | |

Note:
Reference wavelength (d-line) is 587.6 nm.

TABLE 17

Aspheric Coefficients

| Surface # | 2 | 3 | 4 | 5 |
|---|---|---|---|---|
| k= | −2.04809E+00 | −6.35545E+01 | −2.00000E+01 | 1.74648E−01 |
| A4= | 7.40231E−01 | −6.51617E−01 | −1.15056E+00 | −2.18405E+00 |
| A6= | 4.74160E−01 | −1.37830E+00 | −2.76483E+01 | −2.21203E+01 |
| A8= | −1.16031E−01 | 3.00943E+01 | 2.27942E+02 | 1.21558E+02 |
| A10= | 8.62705E+00 | −1.15877E+02 | −9.32328E+02 | −5.03908E+02 |
| A12= | | | 1.59130E+03 | 1.05641E+03 |

| Surface # | 6 | 7 | 8 | 9 |
|---|---|---|---|---|
| k= | −3.78418E+01 | −5.58995E+00 | −9.00000E+01 | 3.28192E−01 |
| A4= | 1.50514E+00 | −2.03365E+00 | −9.96230E−01 | −5.50619E+00 |
| A6= | −1.02063E+01 | 2.54784E+01 | −3.25348E+00 | 2.18542E+01 |
| A8= | 5.52965E+01 | −1.41181E+02 | 3.28722E+01 | −8.08250E+01 |
| A10= | −6.80588E+02 | 2.37333E+02 | 8.17320E+01 | 1.16797E+02 |
| A12= | 2.75735E+03 | 3.04787E+03 | −1.76714E+03 | 2.16402E+02 |
| A14= | 5.25313E+03 | −5.56996E+03 | 1.21271E+04 | −1.08771E+03 |
| A16= | −4.12731E+04 | −2.41286E+04 | −3.16383E+04 | 9.16376E+02 |

TABLE 18

| Spatial Frequency (Cycles/mm) | Diffraction Limit Value | Central Field Modulation Transfer Function (MTF) Value |
|---|---|---|
| 0 | 1.00 | 1.00 |
| 20 | 0.98 | 0.97 |
| 40 | 0.95 | 0.93 |
| 60 | 0.93 | 0.87 |
| 80 | 0.90 | 0.81 |
| 100 | 0.88 | 0.75 |
| 120 | 0.85 | 0.68 |
| 140 | 0.83 | 0.62 |
| 160 | 0.80 | 0.55 |
| 180 | 0.78 | 0.49 |
| 200 | 0.76 | 0.44 |
| 220 | 0.73 | 0.39 |
| 240 | 0.71 | 0.35 |
| 260 | 0.69 | 0.31 |
| 280 | 0.66 | 0.28 |
| 300 | 0.64 | 0.25 |
| 320 | 0.61 | 0.23 |

TABLE 18-continued

| Spatial Frequency (Cycles/mm) | Diffraction Limit Value | Central Field Modulation Transfer Function (MTF) Value |
|---|---|---|
| 340 | 0.59 | 0.21 |
| 360 | 0.57 | 0.20 |
| 380 | 0.55 | 0.18 |
| 400 | 0.52 | 0.17 |

In the optical image capturing lens system according to the 6th embodiment, the definitions of f, Fno, HFOV, FOV, V1, V2, ΣCT, TTL, f4, EPD, Yc42, SD42, SDmax, SDmin, MTF400 and CRAmax are the same as those stated in the 1st embodiment with corresponding values for the 6th embodiment. Moreover, these parameters can be calculated from Tables 16-18 as the following values and satisfy the following relationships:

| f (mm) | 1.48 | f/EPD | 1.65 |
|---|---|---|---|
| Fno | 1.65 | Yc42/SD42 | 0.38 |
| HFOV (deg.) | 18.8 | SDmax/SDmin | 1.17 |
| FOV (deg.) | 37.6 | TTL (mm) | 1.88 |
| V1/V2 | 1.78 | TTL/EPD | 2.09 |
| Σ CT/TTL | 0.63 | MTF400 | 0.17 |
| f/f4 | −1.30 | CRAmax (deg.) | 20.10 |

7th Embodiment

Figure 19:
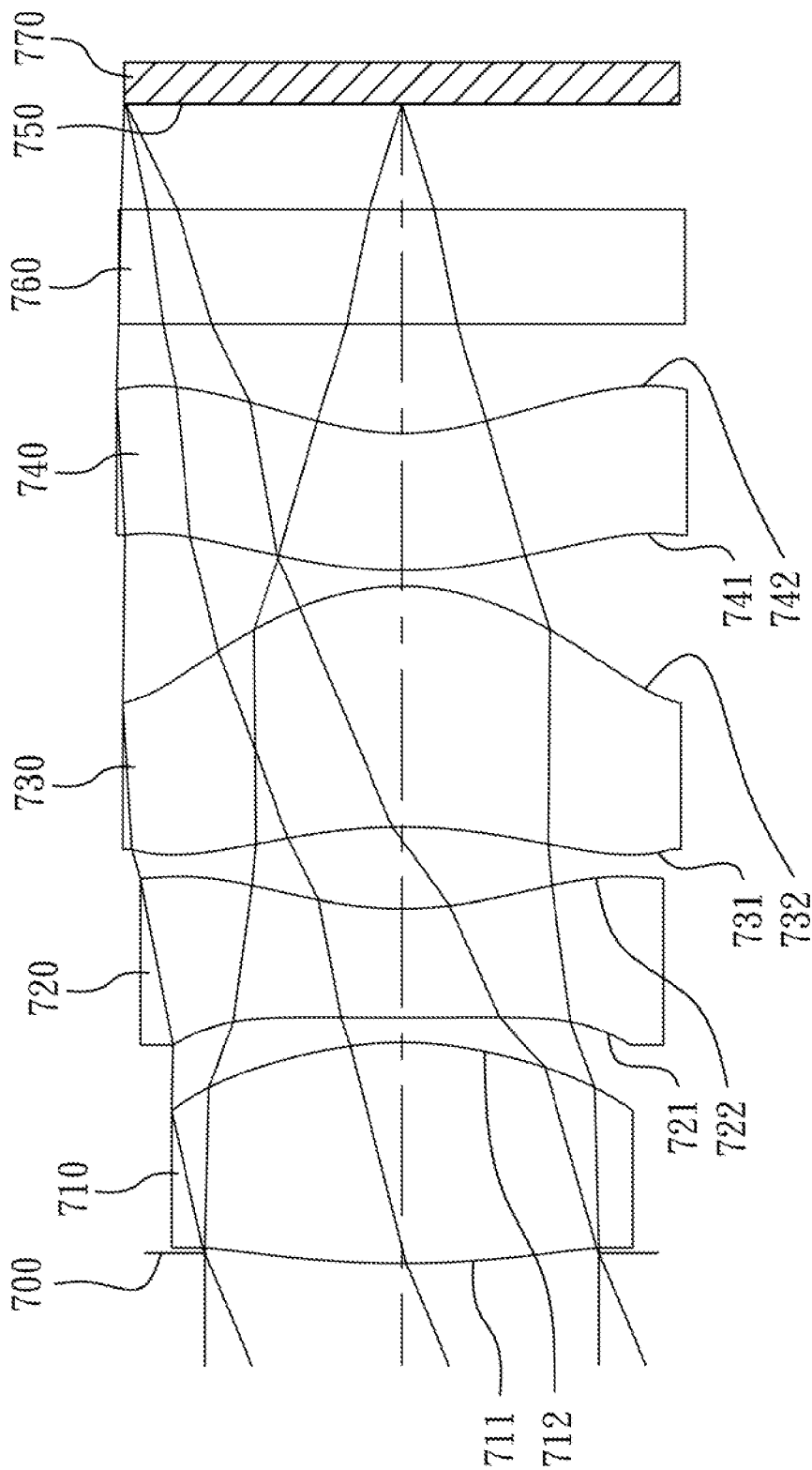
FIG. 19 is a schematic view of an optical image capturing lens system according to the 7th embodiment of the present disclosure.
Figure 20:
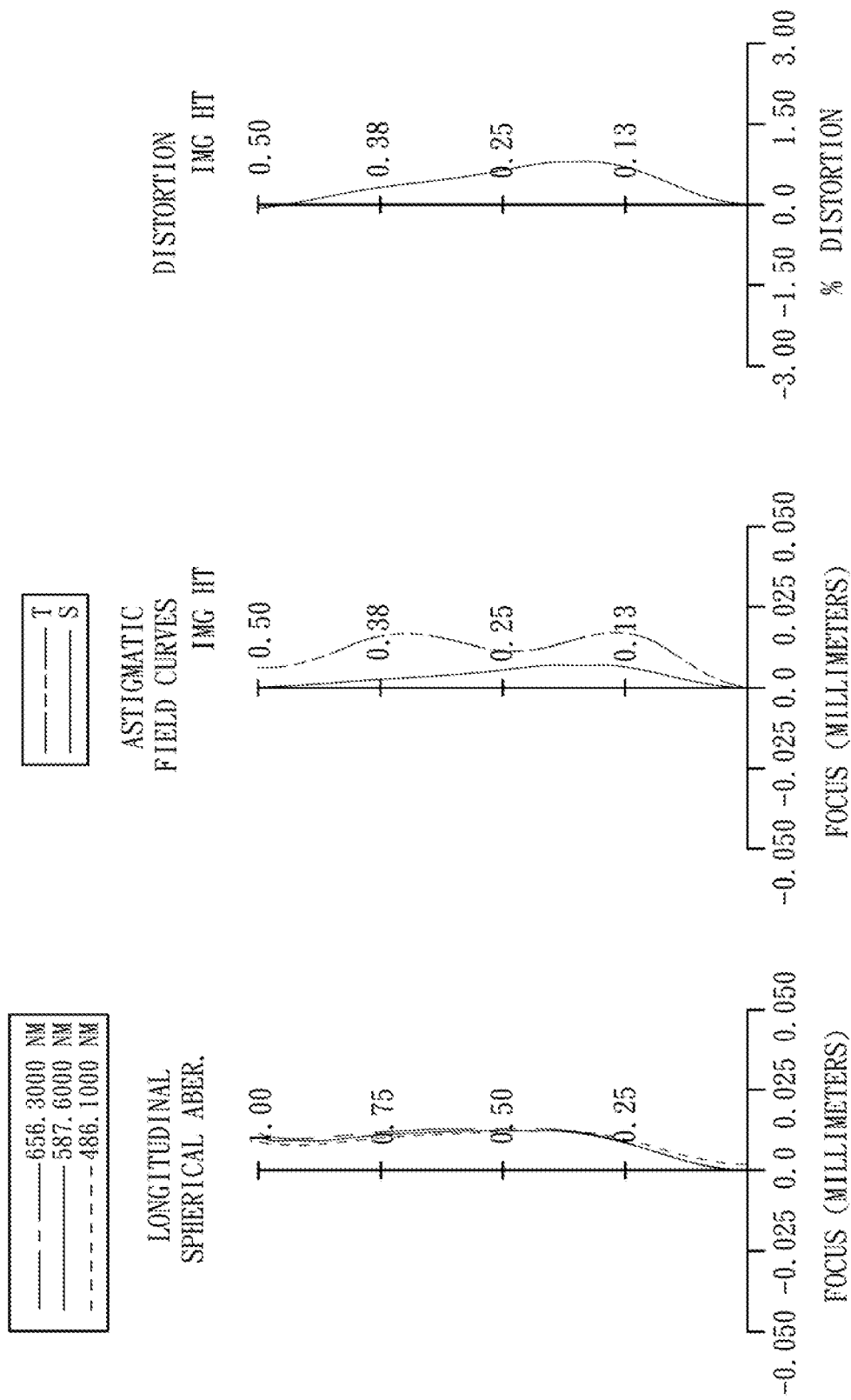
FIG. 20 shows spherical aberration curves, astigmatic field curves and a distortion curve of the optical image capturing lens system according to the 7th embodiment.
Figure 21:
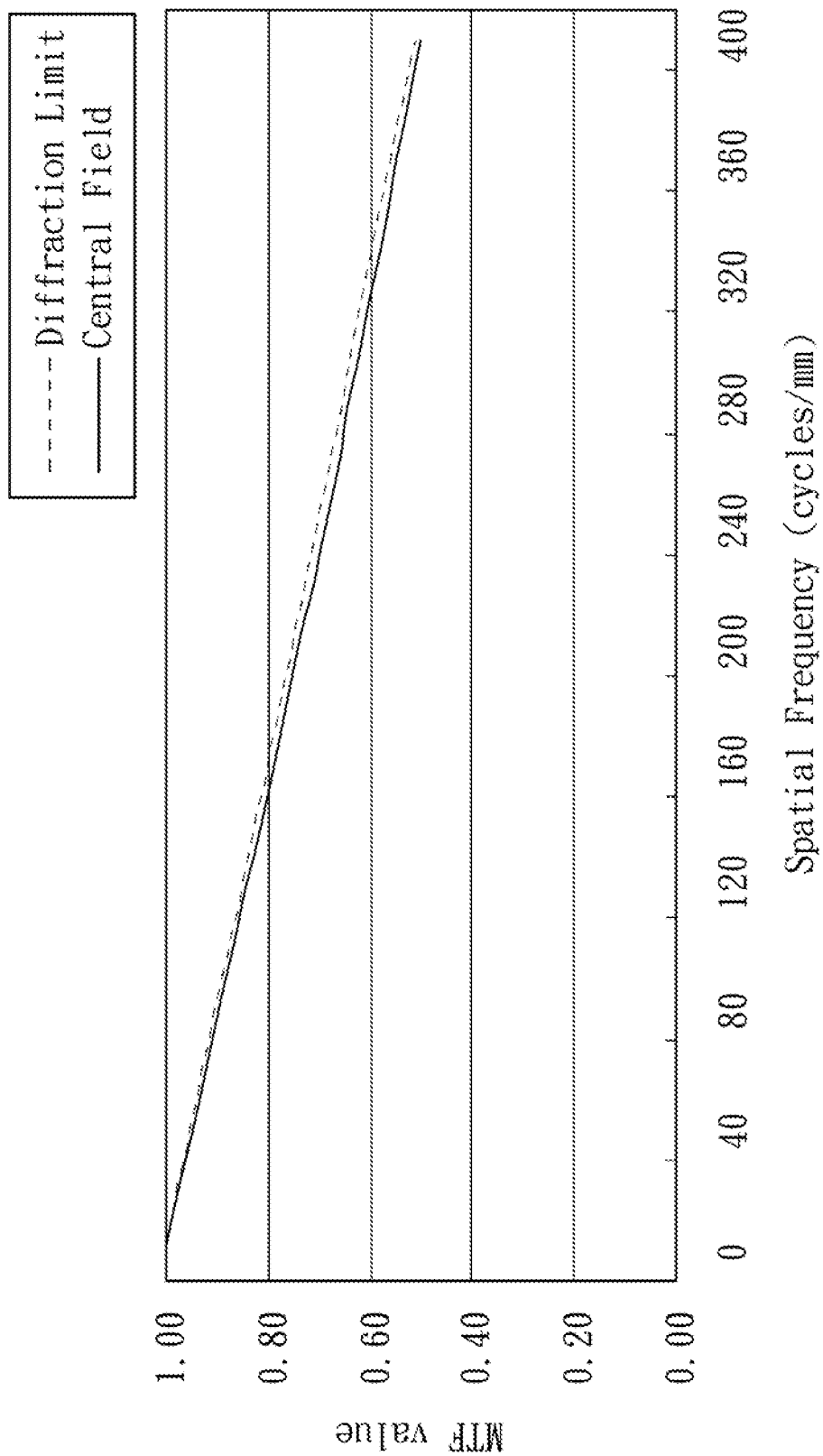
FIG. 21 shows relationship diagrams of spatial frequency-diffraction limit value and spatial frequency-field modulation transfer function value according to the 7th embodiment.

FIG. 19 is a schematic view of an optical image capturing lens system according to the 7th embodiment of the present disclosure. FIG. 20 shows spherical aberration curves, astigmatic field curves and a distortion curve of the optical image capturing lens system according to the 7th embodiment. FIG. 21 shows relationship diagrams of spatial frequency-diffraction limit value and spatial frequency-field modulation transfer function value according to the 7th embodiment. In FIG. 19, the optical image capturing lens system includes, in order from an object side to an image side, an aperture stop 700, a first lens element 710, a second lens element 720, a third lens element 730, a fourth lens element 740, an IR-filter 760, an image plane 750 and an image sensor 770.

The first lens element 710 with positive refractive power has a convex object-side surface 711 and a convex image-side surface 712, and is made of plastic material. The object-side surface 711 and the image-side surface 712 of the first lens element 710 are aspheric.

The second lens element 720 with negative refractive power has a concave object-side surface 721 and a concave image-side surface 722, and is made of plastic material. The object-side surface 721 and the image-side surface 722 of the second lens element 720 are aspheric.

The third lens element 730 with positive refractive power has a concave object-side surface 731 and a convex image-side surface 732, and is made of plastic material. The object-side surface 731 and the image-side surface 732 of the third lens element 730 are aspheric.

The fourth lens element 740 with negative refractive power has a convex object-side surface 741 and a concave image-side surface 742, and is made of plastic material. The object-side surface 741 and the image-side surface 742 of the fourth lens element 740 are aspheric. Furthermore, the fourth lens element 740 has inflection points formed on the object-side surface 741 and the image-side surface 742 thereof.

The IR-filter 760 is made of glass and located between the fourth lens element 740 and the image plane 750, and will not affect the focal length of the optical image capturing lens system.

The detailed optical data of the 7th embodiment are shown in Table 19, the aspheric surface data are shown in Table 20, and the modulation transfer function (MTF) values are shown in Table 21 below.

TABLE 19

7th Embodiment
f = 1.21 mm, Fno = 1.68, HFOV = 22.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.019 | | | | |
| 2 | Lens 1 | 1.804800 (ASP) | 0.404 | Plastic | 1.544 | 55.9 | 0.91 |
| 3 | | −0.630530 (ASP) | 0.045 | | | | |
| 4 | Lens 2 | −100.000000 (ASP) | 0.200 | Plastic | 1.640 | 23.3 | −1.08 |
| 5 | | 0.694450 (ASP) | 0.149 | | | | |
| 6 | Lens 3 | −0.962100 (ASP) | 0.440 | Plastic | 1.544 | 55.9 | 1.07 |
| 7 | | −0.422110 (ASP) | 0.030 | | | | |
| 8 | Lens 4 | 0.817130 (ASP) | 0.250 | Plastic | 1.544 | 55.9 | −2.76 |
| 9 | | 0.472240 (ASP) | 0.200 | | | | |
| 10 | IR-filter | Plano | 0.210 | Glass | 1.517 | 64.2 | — |
| 11 | | Plano | 0.194 | | | | |
| 12 | Image | Plano | — | | | | |

Note:
Reference wavelength (d-line) is 587.8 nm.

TABLE 20

Aspheric Coefficients

| Surface # | 2 | 3 | 4 | 5 |
|---|---|---|---|---|
| k= | −6.76941E+01 | −1.13557E+01 | −8.99900E+01 | 6.15165E−01 |
| A4= | 1.07184E+00 | −9.75446E−01 | 1.41270E+00 | −3.10343E+00 |
| A6= | −9.83141E+00 | −1.18979E+00 | −3.81965E+01 | 6.48961E+00 |
| A8= | 4.35961E+01 | −7.95992E+00 | 2.41113E+02 | −8.26250E+01 |
| A10= | −1.48116E+02 | 2.10340E+01 | −1.14138E+03 | 3.43679E+02 |

TABLE 20-continued

| Aspheric Coefficients | | | | |
|---|---|---|---|---|
| A12= | | | 2.56859E+03 | −5.07020E+02 |
| Surface # | 6 | 7 | 8 | 9 |
| k= | 1.31940E+00 | −4.75161E+00 | 1.00000E+00 | −4.84276E+00 |
| A4= | 1.36302E+00 | −3.68432E+00 | −1.97940E+00 | −1.73723E+00 |
| A6= | −2.26686E+00 | 2.32825E+01 | 4.80535E−01 | 4.78038E+00 |
| A8= | 7.37339E+01 | −7.69885E+01 | −1.52365E+01 | −1.37105E+01 |
| A10= | −5.69595E+02 | 7.02909E−01 | 2.725736E+02 | −3.01380E+00 |
| A12= | 2.32454E+03 | 1.14206E+03 | −2.10033E+03 | 8.86407E+01 |
| A14= | −4.53568E+03 | −2.98953E+03 | 6.72389E+03 | −1.56258E+02 |
| A16= | 3.23274E+03 | 1.82814E+03 | −8.25727E+03 | 7.18953E+01 |

TABLE 21

| Spatial Frequency (Cycles/mm) | Diffraction Limit Value | Central Field Modulation Transfer Function (MTF) Value |
|---|---|---|
| 0 | 1.00 | 1.00 |
| 20 | 0.98 | 0.98 |
| 40 | 0.95 | 0.95 |
| 60 | 0.93 | 0.92 |
| 80 | 0.90 | 0.90 |
| 100 | 0.88 | 0.87 |
| 120 | 0.85 | 0.84 |
| 140 | 0.83 | 0.82 |
| 160 | 0.80 | 0.79 |
| 180 | 0.78 | 0.76 |
| 200 | 0.75 | 0.74 |
| 220 | 0.73 | 0.71 |
| 240 | 0.70 | 0.69 |
| 260 | 0.68 | 0.66 |
| 280 | 0.65 | 0.64 |
| 300 | 0.63 | 0.62 |
| 320 | 0.61 | 0.59 |
| 340 | 0.58 | 0.57 |
| 360 | 0.56 | 0.55 |
| 380 | 0.54 | 0.52 |
| 400 | 0.51 | 0.50 |

In the optical image capturing lens system according to the 7th embodiment, the definitions of f, Fno, HFOV, FOV, V1, V2, ΣCT, TTL, f4, EPS, Yc42, SD42, SDmax, SDmin, MTF400 and CRAmax are the same as those stated in the 1st embodiment with corresponding values for the 7th embodiment. Moreover, these parameters can be calculated from Tables 19-21 as the following values and satisfy the following relationships:

| f (mm) | 1.21 | f/EPD | 1.69 |
|---|---|---|---|
| Fno | 1.68 | Yc42/SD42 | 0.44 |
| HFOV (deg.) | 22.5 | SDmax/SDmin | 1.43 |
| FOV (deg.) | 45.0 | TTL (mm) | 2.05 |
| V1/V2 | 2.40 | TTL/EPD | 2.85 |
| Σ CT/TTL | 0.63 | MTF400 | 0.50 |
| f/f4 | −0.44 | CRAmax (deg.) | 11.68 |

8th Embodiment

Figure 22:
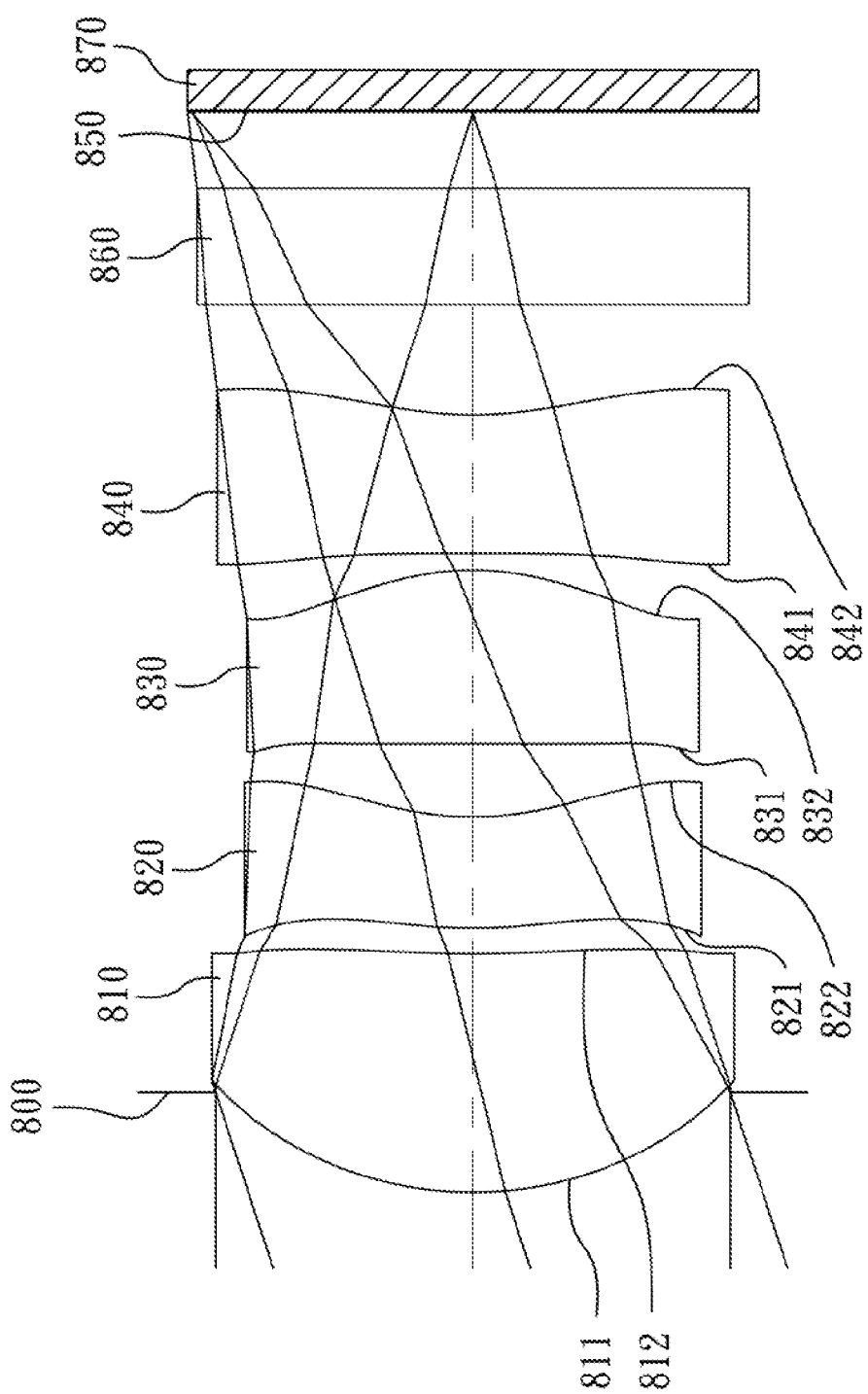
FIG. 22 is a schematic view of an optical image capturing lens system according to the 8th embodiment of the present disclosure.
Figure 23:
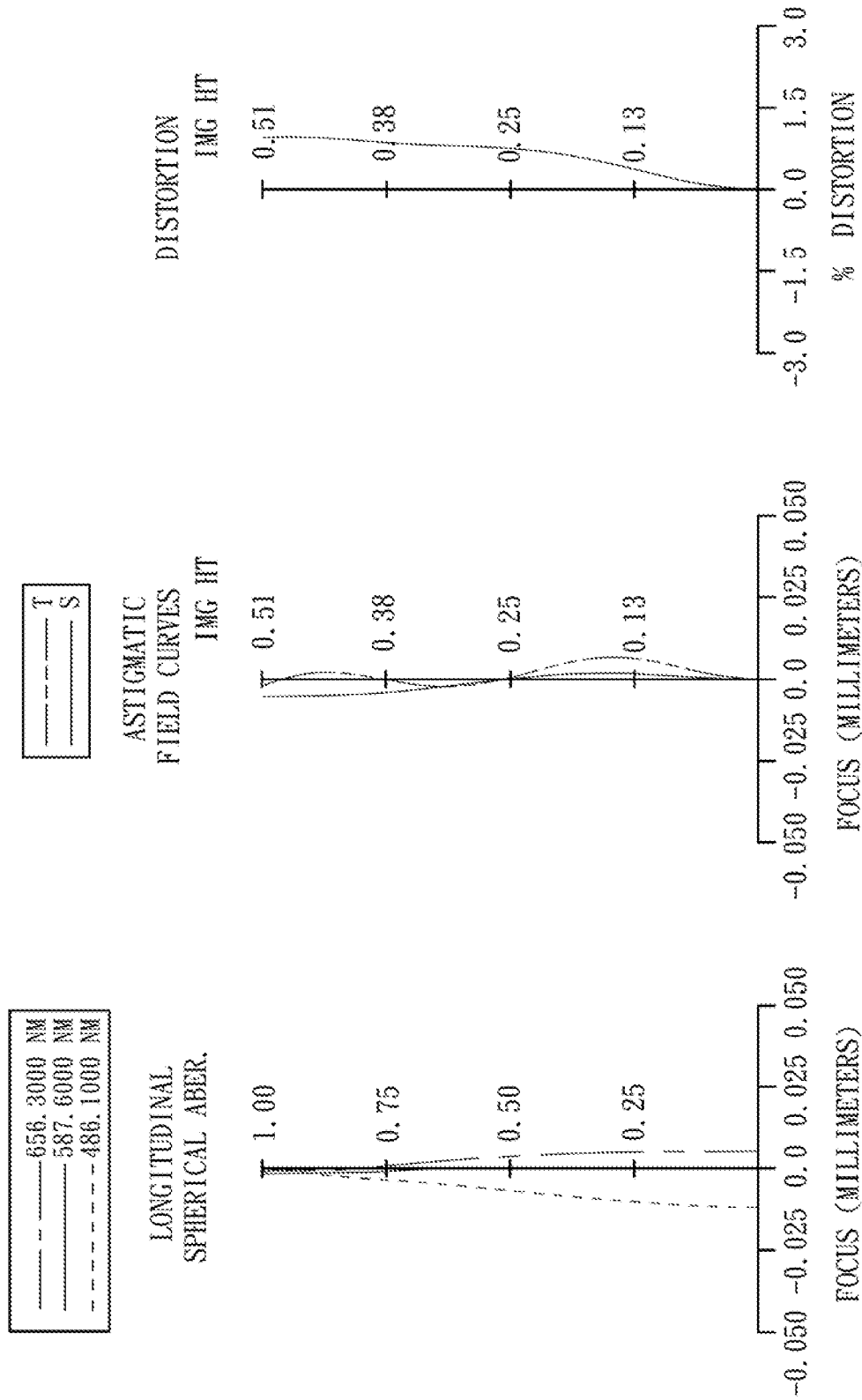
FIG. 23 shows spherical aberration curves, astigmatic field curves and a distortion curve of the optical image capturing lens system according to the 8th embodiment.
Figure 24:
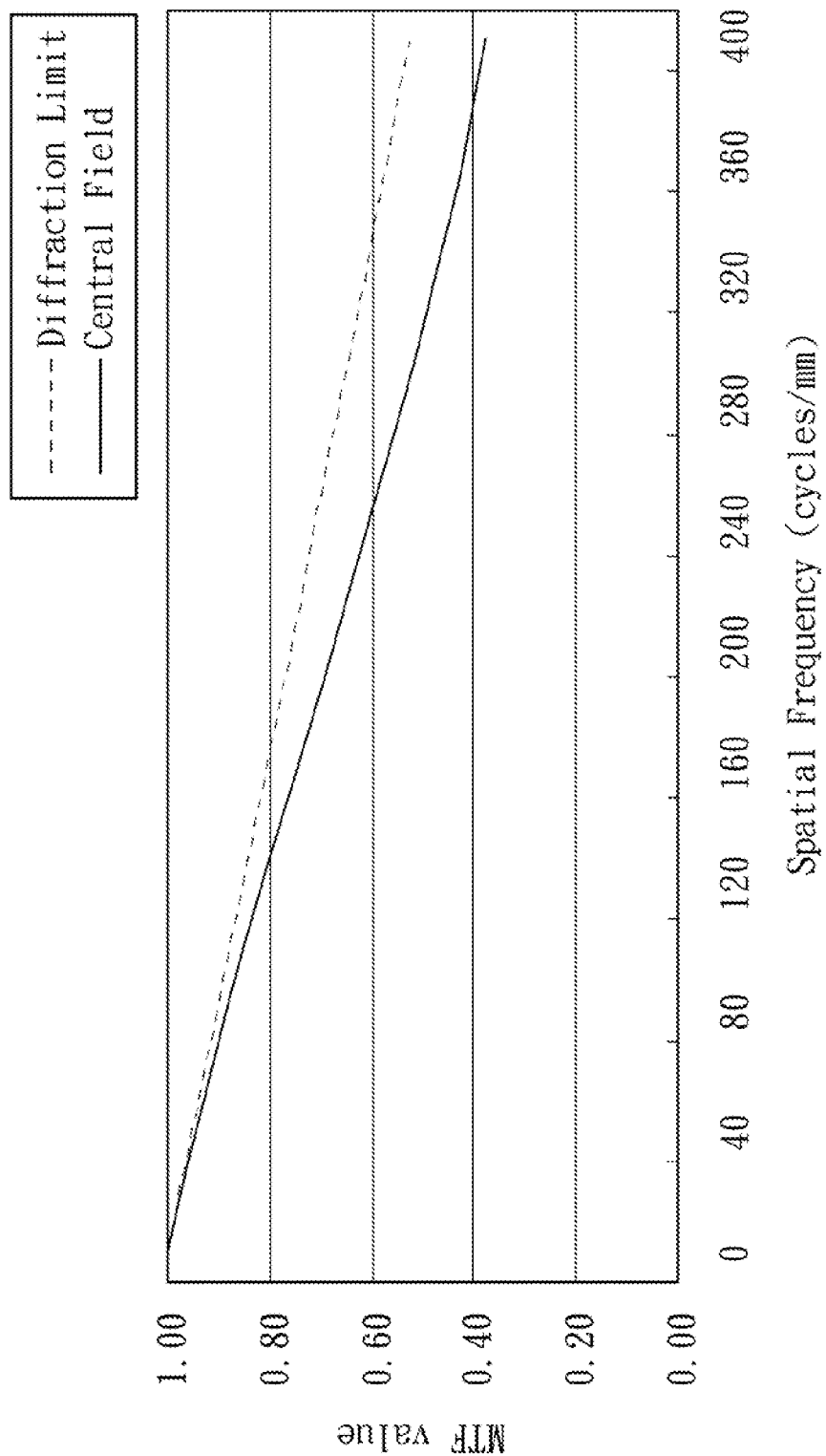
FIG. 24 shows relationship diagrams of spatial frequency-diffraction limit value and spatial frequency-field modulation transfer function value according to the 8th embodiment.

FIG. 22 is a schematic view of an optical image capturing lens system according to the 8th embodiment of the present disclosure. FIG. 23 shows spherical aberration curves, astigmatic field curves and a distortion curve of the optical image capturing lens system according to the 8th embodiment. FIG. 24 shows relationship diagrams of spatial frequency-diffraction limit value and spatial frequency-field modulation transfer function value according to the 8th embodiment. In FIG. 22, the optical image capturing lens system includes, in order from an object side to an image side, an aperture stop 800, a first lens element 810, a second lens element 820, a third lens element 830, a fourth lens element 840, an IR-filter 860, an image plane 850 and an image sensor 870.

The first lens element 810 with positive refractive power has a convex object-side surface 811 and a concave image-side surface 812, and is made of plastic material. The object-side surface 811 and the image-side surface 812 of the first lens element 810 are aspheric.

The second lens element 820 with negative refractive power has a convex object-side surface 821 and a concave image-side surface 822, and is made of plastic material. The object-side surface 821 and the image-side surface 822 of the second lens element 820 are aspheric.

The third lens element 830 with positive refractive power has a concave object-side surface 831 and a convex image-side surface 832, and is made of plastic material. The object-side surface 831 and the image-side surface 832 of the third lens element 830 are aspheric.

The fourth lens element 840 with negative refractive power has a concave object-side surface 841 and a concave image-side surface 842, and is made of plastic material. The object-side surface 841 and the image-side surface 842 of the fourth lens element 840 are aspheric. Furthermore, the fourth lens element 840 has inflection points formed on the object-side surface 841 and the image-side surface 842 thereof.

The IR-filter 860 is made of glass and located between the fourth lens element 840 and the image plane 850, and will not affect the focal length of the optical image capturing lens system.

The detailed optical data of the 8th embodiment are shown in Table 22, the aspheric surface data are shown in Table 23, and the modulation transfer function (MTF) values are shown in Table 24 below.

TABLE 22

8th Embodiment
f = 1.53 mm, Fno = 1.65, HFOV = 18.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.180 | | | | |

TABLE 22-continued

8th Embodiment
f = 1.53 mm, Fno = 1.65, HFOV = 18.1 deg.

| Surface # | | Curvature Radius | Thickness | Material | Index | Abbe # | Focal length |
|---|---|---|---|---|---|---|---|
| 2 | Lens 1 | 0.670870 (ASP) | 0.430 | Plastic | 1.530 | 55.8 | 1.69 |
| 3 | | 2.097780 (ASP) | 0.047 | | | | |
| 4 | Lens 2 | 0.950660 (ASP) | 0.200 | Plastic | 1.640 | 23.3 | −2.76 |
| 5 | | 0.567370 (ASP) | 0.132 | | | | |
| 6 | Lens 3 | −10.309300 (ASP) | 0.313 | Plastic | 1.535 | 56.3 | 0.91 |
| 7 | | −0.469710 (ASP) | 0.030 | | | | |
| 8 | Lens 4 | −9.830400 (ASP) | 0.250 | Plastic | 1.530 | 55.8 | −1.16 |
| 9 | | 0.660670 (ASP) | 0.200 | | | | |
| 10 | IR-filter | Plano | 0.210 | Glass | 1.517 | 64.2 | — |
| 11 | | Plano | 0.138 | | | | |
| 12 | Image | Plano | — | | | | |

Note:
Reference wavelength (d-line) is 587.6 nm.

TABLE 23

Aspheric Coefficients

| Surface # | 2 | 3 | 4 | 5 |
|---|---|---|---|---|
| k= | −1.78210E+00 | −9.00000E+01 | −2.00000E+01 | 3.90895E−01 |
| A4= | 8.05495E−01 | −1.08392E+00 | −1.38246E+00 | −2.54949E+00 |
| A6= | 4.59286E−01 | 2.25108E−01 | −2.81938E+01 | −2.31390E+01 |
| A8= | 2.23001E−01 | 2.60885E+01 | 2.35867E+02 | 1.27295E+02 |
| A10= | 8.77040E+00 | −1.06137E+02 | −8.46413E+02 | −5.59236E+02 |
| A12= | | | 1.16881E+03 | 1.05641E+03 |

| Surface # | 6 | 7 | 8 | 9 |
|---|---|---|---|---|
| k= | −9.00000E+01 | −6.44434E+00 | −9.00000E+01 | 2.63105E+01 |
| A4= | 1.57754E+00 | −1.85298E+00 | −4.69675E−01 | −5.70395E+00 |
| A6= | −1.14002E+01 | 2.47937E+01 | −7.83467E+00 | 2.48059E+01 |
| A8= | 3.61175E+01 | −1.23740E+02 | 6.61742E+01 | −9.92128E+01 |
| A10= | −6.57518E+02 | 1.70432E+02 | 6.97338E+01 | 1.45769E+02 |
| A12= | 2.75735E+03 | 3.04787E+03 | −2.33809E+03 | 2.71126E+02 |
| A14= | 5.25311E+03 | −5.56998E+03 | 1.21820E+04 | −1.12686E+03 |
| A16= | −4.12731E+04 | −2.41286E+04 | −2.52484E+04 | 4.03170E+02 |

TABLE 24

| Spatial Frequency (Cycles/mm) | Diffraction Limit Value | Central Field Modulation Transfer Function (MTF) Value |
|---|---|---|
| 0 | 1.00 | 1.00 |
| 20 | 0.98 | 0.97 |
| 40 | 0.95 | 0.95 |
| 60 | 0.93 | 0.92 |
| 80 | 0.90 | 0.89 |
| 100 | 0.88 | 0.85 |
| 120 | 0.85 | 0.82 |
| 140 | 0.83 | 0.78 |
| 160 | 0.80 | 0.75 |
| 180 | 0.78 | 0.71 |
| 200 | 0.76 | 0.68 |
| 220 | 0.73 | 0.64 |
| 240 | 0.71 | 0.61 |
| 260 | 0.69 | 0.57 |
| 280 | 0.66 | 0.54 |
| 300 | 0.64 | 0.51 |
| 320 | 0.62 | 0.48 |
| 340 | 0.59 | 0.45 |
| 360 | 0.57 | 0.42 |
| 380 | 0.55 | 0.40 |
| 400 | 0.52 | 0.38 |

In the optical image capturing lens system according to the 8th embodiment, the definitions of f, Fno, HFOV, FOV, V1, V2, ΣCT, TTL, f4, EPD, Yc42, SD42, SDmax, SDmin, MTF400 and CRAmax are the same as those stated in the 1st embodiment with corresponding values for the 8th embodiment. Moreover, these parameters can be calculated from Tables 22-24 as the following values and satisfy the following relationships:

| | | | |
|---|---|---|---|
| f (mm) | 1.53 | f/EPD | 1.65 |
| Fno | 1.65 | Yc42/SD42 | 0.43 |
| HFOV (deg.) | 18.1 | SDmax/SDmin | 1.19 |
| FOV (deg.) | 36.2 | TTL (mm) | 1.88 |
| V1/V2 | 2.39 | TTL/EPD | 2.03 |
| Σ CT/TTL | 0.63 | MTF400 | 0.38 |
| f/f4 | −1.32 | CRAmax (deg.) | 21.92 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical image capturing lens system comprising, in order from an object side to an image side:
    a first lens element with positive refractive power having a convex object-side surface;
    a second lens element with negative refractive power made of plastic material, wherein both of an object-side surface and an image-side surface of the second lens element are aspheric;

a third lens element with positive refractive power, wherein an object-side surface and an image-side surface of the third lens element are aspheric; and a fourth lens element with refractive power made of plastic material and having a concave image-side surface, wherein an object-side surface and the image-side surface of the fourth lens element are aspheric, and the fourth lens element has at least one inflection point formed on the image-side surface thereof;

wherein the optical image capturing lens system has a total of four lens elements with refractive power, a distance perpendicular to an optical axis between the inflection point on the image-side surface of the fourth lens element and the optical axis is Yc42, an effective radius of the image-side surface of the fourth lens element is SD42, a maximum effective radius of the surfaces of the first through fourth- lens elements is SDmax, and a minimum effective radius of the surfaces of the first through fourth lens elements is SDmin, a focal length of the optical image capturing lens system is f, and an entrance pupil diameter of the optical image capturing lens system is EPD, the following relationships are satisfied:

$0.2 < Yc42/SD42 < 0.95$;

$1.0 \leq SDmax/SDmin < 2.0$; and $f/EPD < 1.9$.

2. The optical image capturing lens system of claim 1, wherein the image-side surface of the third lens element is convex.

3. The optical image capturing lens system of claim 2, wherein the maximum effective radius of the surfaces of the first through fourth lens elements is SDmax, and the minimum effective radius of the surfaces of the first through fourth lens elements is SDmin, the following relationship is satisfied:

$1.0 \leq SDmax/SDmin < 1.75$.

4. The optical image capturing lens system of claim 3, wherein an axial distance between the object-side surface of the first lens element and an image plane is TTL, and the following relationship is satisfied:

$TTL < 2.1$ mm.

5. The optical image capturing lens system of claim 3, wherein an axial distance between the object-side surface of the first lens element and are image plane is TTL, and the entrance pupil diameter of the optical image capturing lens system is EPD, the following relationship is satisfied:

$1.5 < TTL/EPD < 3.0$.

6. The optical image capturing lens system of claim 5, wherein the image-side surface of the second lens element is concave.

7. The optical image capturing lens system of claim 6, wherein the object-side surface of the third lens element is concave.

8. The optical image capturing lens system of claim 7, further comprising:

a stop located between an object and a first lens element, wherein the object-side surface of the fourth lens element is convex.

9. The optical image capturing lens system of claim 3, wherein an Abbe number of the first lens element is V1, and an Abbe number of the second lens element is V2, the following relationship is satisfied:

$2.0 < V1/V2 < 3.0$.

10. The optical image capturing lens system of claim 3, wherein the focal length of the optical image capturing lens system is f, and a focal length of the fourth lens element is f4, the following relationship is atisfied:

$-0.6 < f/f4 < 0.2$.

11. The optical image capturing lens system of claim 3, wherein the image-side surface of the second lens element is concave, and the object-side surface of the fourth lens element is convex.

12. The optical image capturing lens system of claim 4, wherein a maximal field of view of the optical image capturing lens system is FOV, and a maximum of a chief ray angle of the optical image capturing lens system is CRAmax, the following relationships are satisfied:

$FOV < 50$ degrees; and $CRAmax < 25.0$ degrees.

13. The optical image capturing lens system of claim 12, wherein when a modulation transfer function value at the central field with the spatial frequency of 400 lp/mm is MTF400, the following relationship is satisfied:

$0.4 < MTF400$.

14. The optical image capturing lens system of claim 12, wherein the first through fourth lens elements are four non-cemented lens elements, a sum of the central thickness from the first through fourth lens elements is $\Sigma CT$, and the axial distance between the object-side surface of the first lens element and an image plane is TTL, the following relationship is satisfied:

$0.58 < \Sigma CT/TTL \leq 0.80$.

15. The optical image capturing lens system of claim 2, wherein the maximum effective radius of the surfaces of the first through fourth lens elements is SDmax, and the minimum effective radius of the surfaces of the first through fourth lens elements is SDmin, the following relationship is satisfied:

$1.0 \leq SDmax/SDmin < 1.5$.

16. The optical image capturing lens system of claim 2, wherein when a modulation transfer function value at the central field with the spatial frequency of 400 lp/mm is MTF400, the following relationship is satisfied:

$0.4 < MTF400$.

17. An optical age capturing lens system comprising, in order from an object side to an image side:

a first lens element with positive refractive power having a convex object-side surface;

a second lens element with negative refractive power made of plastic material, wherein both of an object-side surface and an image-side surface of the second lens element are aspheric;

a third lens element with positive refractive power having a convex image-side surface, wherein an object-side surface and the image-side surface of the third lens element are aspheric; and a fourth lens element with refractive power made of plastic material and having a concave image-side surface, wherein an object-side surface and the image-side surface of the fourth lens element are aspheric, and the fourth lens element has at least one inflection point formed on the image-side surface thereof;

wherein the optical image capturing lens system has a total of four lens elements with refractive power, a distance perpendicular to an optical axis between the inflection point on the image-side surface of the fourth lens element and the optical axis is Yc42, an effective radius of the image-side surface of the fourth lens element is SD42, a focal length of the optical image capturing lens system is f, and an entrance pupil diameter of the optical image capturing lens system is EPD, the following relationships are satisfied:

$0.2 < Yc42/SD42 < 0.95$; and $f/EPD < 1.9$.

18. The optical image capturing lens system of claim 17, wherein the image-side surface of the second lens element is concave.

19. The optical image capturing lens system of claim 18, further comprising:
   a stop located between an object and a first lens element, wherein the object-side surface of the third lens element is concave, and the object-side surface of the fourth lens element is convex.

20. The optical image capturing lens system of claim 19, wherein the focal length of the optical image capturing lens system is f, a focal length of the fourth lens element is f4, and the following relationship is satisfied:

$-0.6 < f/f4 < 0.2$.

21. The optical image capturing lens system of claim 18, wherein when a modulation transfer function value at the central field with the spatial frequency of 400 lp/mm is MTF400, the following relationship is satisfied:

$0.4 < MTF400$.

22. The optical image capturing lens system of claim 18, wherein a maximal field of view of the optical image capturing lens system is FOV, an Abbe number of the first lens element is V1 an Abbe number of the second lens element is V2, and the following relationships are satisfied:

$FOV < 50$ degrees; and $2.0 < V1/V2 < 3.0$.

23. The optical image capturing lens system of claim 18, wherein a maximum effective radius of the surfaces of the first through fourth lens elements is SDmax, a minimum effective radius of the surfaces of the first through fourth lens elements is SDmin, and the following relationship is satisfied:

$1.0 \leq SDmax/SDmin < 1.5$.

24. The optical image capturing lens system of claim 17, wherein the focal length of the optical image capturing lens system is f, and the entrance pupil diameter of the optical image capturing lens system is EPD, the following relationship is satisfied:

$f/EPD < 1.7$.

* * * * *

UNITED STATES PATENT AND TRADEMARK OFFICE
CERTIFICATE OF CORRECTION

PATENT NO. : 8,804,252 B2
APPLICATION NO. : 13/598595
DATED : August 12, 2014
INVENTOR(S) : Dung-Yi Hsieh and Hsin-Hsuan Huang It is certified that error appears in the above-identified patent and that said Letters Patent is hereby corrected as shown below:

In the Claims, (1) In column 29, line 17, Claim 1 of the issued patent reads as "first through fourth- lens elements", but it should read as "first through fourth lens elements".
(2) In column 29, line 47, Claim 5 of the issued patent reads as "the first lens element and are image plane", but it should read as "the first lens element and an image plane".
(3) In column 29, line 60, Claim 8 of the issued patent reads as "an object and a first lens element", but it should read as "an object and the first lens element".
(4) In column 30, line 29, Claim 14 of the issued patent reads as "and an image plane is TTL", but it should read as "and the image plane is TTL".
(5) In column 30, line 46, Claim 17 of the issued patent reads as "An optical age capturing lens system", but it should read as "An optical image capturing lens system".
(6) In column 31, line 15, Claim 19 of the issued patent reads as "an object and a first lens element", but it should read as "an object and the first lens element".
(7) In column 32, line 8, Claim 22 of the issued patent reads as "element is V1 an Abbe number", but it should read as "element is V1, an Abbe number".

Signed and Sealed this
Twenty-third Day of December, 2014

Michelle K. Lee
*Deputy Director of the United States Patent and Trademark Office*